US012763611B2

(12) United States Patent
Shichino

(10) Patent No.: US 12,763,611 B2
(45) Date of Patent: Oct. 13, 2026

(54) POWER RECEIVING APPARATUS, POWER TRANSMISSION APPARATUS, WIRELESS POWER TRANSMISSION METHOD, AND STORAGE MEDIUM

(71) Applicant: CANON KABUSHIKI KAISHA, Tokyo (JP)

(72) Inventor: Takahiro Shichino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 272 days.

(21) Appl. No.: 18/634,410

(22) Filed: Apr. 12, 2024

(65) Prior Publication Data

US 2024/0258836 A1 Aug. 1, 2024

Related U.S. Application Data

(63) Continuation of application No. PCT/JP2022/037569, filed on Oct. 7, 2022.

(30) Foreign Application Priority Data

Oct. 18, 2021 (JP) ................................ 2021-170507

(51) Int. Cl.
*H02J 50/60* (2016.01)
*B60L 50/60* (2019.01)
(Continued)

(52) U.S. Cl.
CPC .............. *H02J 50/60* (2016.02); *B60L 50/60* (2019.02); *B60L 53/124* (2019.02); *H02J 7/82* (2026.01);
(Continued)

(58) Field of Classification Search
CPC .. H02J 50/12; H02J 50/60; H02J 50/80; H02J 7/82; H02J 7/855; B60L 50/60; B60L 53/124
See application file for complete search history.

(56) References Cited

U.S. PATENT DOCUMENTS

| | | | |
|---|---|---|---|
| 10,110,066 | B2 | 10/2018 | Watanabe et al. |
| 10,778,048 | B2 | 9/2020 | Van Wageningen |

(Continued)

FOREIGN PATENT DOCUMENTS

| | | | |
|---|---|---|---|
| JP | 2017070074 | A | 4/2017 |
| JP | 2021129457 | A | 9/2021 |

(Continued)

*Primary Examiner* — Nguyen T Vo
(74) *Attorney, Agent, or Firm* — Canon U.S.A., Inc. IP Division

(57) ABSTRACT

A power receiving apparatus wirelessly receives power from a power transmission apparatus that performs first detection processing of detecting a foreign object based on values of voltages or currents at at least two time points in a predetermined period during which power transmission is restricted, transmits, to the power transmission apparatus, data indicating received power that is to be used in second detection processing of detecting a foreign object based on power loss in accordance with a result of the first detection processing, changes an output voltage to be output to a load, and, in a case where the output voltage is changed after the data is transmitted, controls the data not to be used in the second detection processing.

14 Claims, 17 Drawing Sheets

(51) Int. Cl.

| | |
|---|---|
| ***B60L 53/124*** | (2019.01) |
| ***H02J 7/00*** | (2026.01) |
| ***H02J 7/82*** | (2026.01) |
| ***H02J 50/12*** | (2016.01) |
| ***H02J 50/80*** | (2016.01) |

(52) U.S. Cl.

CPC .............. *H02J 7/855* (2026.01); *H02J 50/12* (2016.02); *H02J 50/80* (2016.02)

(56) References Cited

U.S. PATENT DOCUMENTS

| | | | | |
|---|---|---|---|---|
| 2017/0093214 | A1* | 3/2017 | Watanabe | H02J 50/60 |
| 2020/0350788 | A1 | 11/2020 | Park et al. | |
| 2021/0083525 | A1* | 3/2021 | Stingu | G01R 33/07 |
| 2021/0175756 | A1* | 6/2021 | Tachiwa | H02J 50/10 |
| 2021/0257864 | A1 | 8/2021 | Stingu | |
| 2024/0223020 | A1* | 7/2024 | Lee | H02J 50/80 |

FOREIGN PATENT DOCUMENTS

| | | | |
|---|---|---|---|
| JP | 2021523670 | A | 9/2021 |
| JP | 2021164284 | A | 10/2021 |

* cited by examiner

FIG.9

RPP

| | b7 | b6 | b5 | b4 | b3 | b2 | b1 | b0 |
|---|---|---|---|---|---|---|---|---|
| Bank0 | Reserved | | | | | Mode | | |
| Bank1 | Received Power Value | | | | | | | |
| Bank2 | | | | | | | | |

POWER RECEIVING APPARATUS, POWER TRANSMISSION APPARATUS, WIRELESS POWER TRANSMISSION METHOD, AND STORAGE MEDIUM

CROSS-REFERENCE TO RELATED APPLICATIONS

This application is a Continuation of International Patent Application No. PCT/JP2022/037569, filed Oct. 7, 2022, which claims the benefit of Japanese Patent Application No. 2021-170507, filed Oct. 18, 2021, both of which are hereby incorporated by reference herein in their entireties.

BACKGROUND OF THE INVENTION

Field of the Invention

The present disclosure relates to a technique of wireless power transmission.

Background Art

The technical development of wireless power transmission systems has been widely conducted, and a standard (Wireless Power Consortium (WPC) standard) stipulated by the WPC being a standard-setting organization has been widely known. In such wireless power transmission, in a case where an object (hereinafter, will be referred to as a foreign object) different from a power receiving apparatus to which power is to be transmitted exists within a range in which a power transmission apparatus can transmit power, the foreign object is detected and power transmission and reception are controlled. Patent Literature 1 discusses a method of detecting a foreign object based on power loss, in a case where a foreign object exists near a power transmission/receiving apparatus complying with the WPC standard.

CITATION LIST

Patent Literature

PTL 1: Japanese Patent Application Laid-Open No. 2017-070074

In a case where the detection of a foreign object is performed based on power loss as discussed in Patent Literature 1, if an output voltage to be output by a power receiving apparatus to a load is changed, the accuracy of foreign object detection can deteriorate in some cases.

SUMMARY OF THE INVENTION

The present disclosure has been devised in view of the above-described issue. The object of the present disclosure is to cause control for preventing accuracy deterioration attributed to a change in an output voltage to a load of a power receiving apparatus, to be performed in foreign object detection processing of detecting an object different from the power receiving apparatus based on power loss.

A power receiving apparatus according to the present disclosure wirelessly receives power from a power transmission apparatus that performs first detection processing of detecting a foreign object based on values of voltages or currents at at least two time points in a predetermined period during which power transmission is restricted, and transmits, to the power transmission apparatus, data indicating received power of the power receiving apparatus that is to be used in second detection processing in which the power transmission apparatus detects a foreign object based on power loss that is based on transmitted power of the power transmission apparatus and received power of the power receiving apparatus, in accordance with a result of the first detection processing. And, the power receiving apparatus changes an output voltage to be output to a load included in the power receiving apparatus, and, in a case where the output voltage is changed by the change unit after the data is transmitted, controls the data not to be used in the second detection processing.

Further features of the present invention will become apparent from the following description of exemplary embodiments with reference to the attached drawings.

BRIEF DESCRIPTION OF THE DRAWINGS

FIG. 9 is a diagram illustrating a frame format of a Received Power Packet.

DESCRIPTION OF THE EMBODIMENTS

Figure 1:
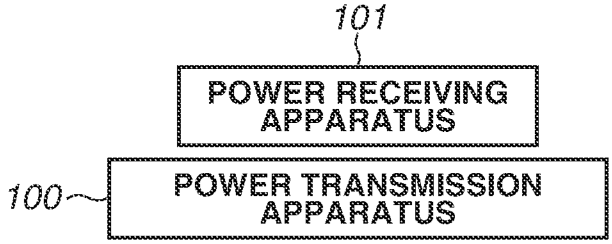
FIG. 1 is a configuration diagram of a system.

Hereinafter, exemplary embodiments will be described in detail with reference to the accompanying drawings. In addition, the following exemplary embodiment is not intended to limit the disclosure set forth in the appended claims. A plurality of features is described in the exemplary embodiment, but not all of the plurality of features are always essential. Further, the plurality of features may be arbitrarily combined. Furthermore, in the accompanying drawings, the same or similar components are assigned the same reference numerals, and the redundant description will be omitted.

First Exemplary Embodiment (Configuration of System)

FIG. 1 is a diagram illustrating a configuration example of a wireless power transmission system according to the present exemplary embodiment. FIG. 1 illustrates a configuration example of the wireless power transmission system according to the present exemplary embodiment. This wireless power transmission system includes, as an example, a power transmission apparatus 100 and a power receiving apparatus 101. The power transmission apparatus 100 and the power receiving apparatus 101 in the present exemplary embodiment are assumed to comply with a Wireless Power Consortium standard (hereinafter, will be referred to as a WPC standard). The power transmission apparatus 100 transmits power to the power receiving apparatus 101 placed on itself. In addition, a "placed" state refers to a state in which the power receiving apparatus 101 is included in a power transmission executable range of the power transmission apparatus 100, and the power transmission apparatus 100 and the power receiving apparatus 101 need not be always in contact.

The power receiving apparatus 101 and the power transmission apparatus 100 can have a function of executing an application other than wireless power transmission. An example of the power receiving apparatus 101 is an information processing terminal such as a smartphone, and an example of the power transmission apparatus 100 is an accessory device for charging the information processing terminal. For example, an information terminal device includes a display unit (display) to which power received from a power receiving coil (antenna) is supplied and which displays information to a user. Further, power received from the power receiving coil is stored into a power storage unit (battery), and power is supplied from the battery to the display unit. In this case, the power receiving apparatus 101 may include a communication unit communicating with another apparatus different from the power transmission apparatus 100. The communication unit may comply with communication standards such as Near Field Communication (NFC) communication and the 5th Generation Mobile Communication System (5G). Further, in this case, the communication unit may perform communication by power being supplied from the battery to the communication unit. Further, the power receiving apparatus 101 may be a tablet terminal or a storage device such as a hard disc device or a memory device, or may be an information processing apparatus such as a personal computer (PC). Further, the power receiving apparatus 101 may be an imaging apparatus (camera, video camera, etc.), for example. Further, the power receiving apparatus 101 may be an image input device such as a scanner, or may be an image output device such as a printer, a copying machine, or a projector. Further, the power receiving apparatus 101 may be a robot, a medical device, or the like. The power transmission apparatus 100 can be an apparatus for charging the above-described devices. Further, the power transmission apparatus 100 may be a smartphone. In this case, the power receiving apparatus 101 may be another smartphone, or may be wireless earphones. Further, the power transmission apparatus 100 may include a battery, and be configured to wirelessly transmit power to the power receiving apparatus 101 using power stored in the battery. Further, the power transmission apparatus 100 may be a vehicle such as an automobile, or a charger installed in a console or the like within a vehicle. Further, the power receiving apparatus 101 may have a function of notifying the user of a remaining amount of a battery using display or sound.

Further, the power receiving apparatus 101 in the present exemplary embodiment may be a vehicle such as an automobile. For example, the automobile serving as the power receiving apparatus 101 may be an apparatus that receives power from a charger (power transmission apparatus 100) via a power transmission antenna installed in a parking area. Further, the automobile serving as the power receiving apparatus 101 may be an apparatus that receives power from a charger (power transmission apparatus 100) via a power transmission coil (antenna) buried in a road. Power received by such an automobile is supplied to a battery. Power in the battery may be supplied to an actuator (motor, electroactuation unit) that drives wheels, or may be used for the driving of a sensor to be used for driving assistance or the driving of a communication unit that performs communication with an external apparatus. In other words, in this case, the power receiving apparatus 101 may include a battery, and a motor and a sensor that are to be driven using received power, and further include a communication unit that performs communication with an apparatus other than the power transmission apparatus 100, in addition to wheels. Furthermore, the power receiving apparatus 101 may include an accommodation unit that accommodates a person. Examples of the sensor include a sensor to be used to measure an inter-vehicular distance or a distance to another obstacle, and the like. The communication unit may support the Global Positioning System or Global Positioning Satellite (GPS), for example. Further, the communication unit may comply with a communication standard such as the 5th Generation Mobile Communication System (5G). Further, the vehicle may be a bicycle or a motorbike. Further, the power receiving apparatus 101 is not limited to vehicles, and may be a movable body, a flight vehicle, and the like that include an actuator that performs driving using power stored in a battery. Further, the power receiving apparatus 101 need not have an internal battery.

Further, in this system, based on the WPC standard, wireless power transmission that uses an electromagnetic induction method for wireless charging is performed. That is, the power transmission apparatus 100 and the power receiving apparatus 101 perform wireless power transmission for wireless charging that is based on the WPC standard, between a power transmission coil of the power transmission apparatus 100 and a power receiving coil of the power receiving apparatus 101. In addition, a method defined by the WPC standard is assumed to be used in this system as a wireless power transmission method, but a wireless power transmission method is not limited to this, and another method may be used. For example, an electromagnetic induction method, a magnetic field resonance method, an electric field resonance method, a microwave method, a method that uses laser, or the like may be used. Further, in the present exemplary embodiment, wireless power transmission is assumed to be used for wireless charging, but wireless power transmission may be performed for purposes other than wireless charging.

(Configuration of Apparatus)

Figure 2:
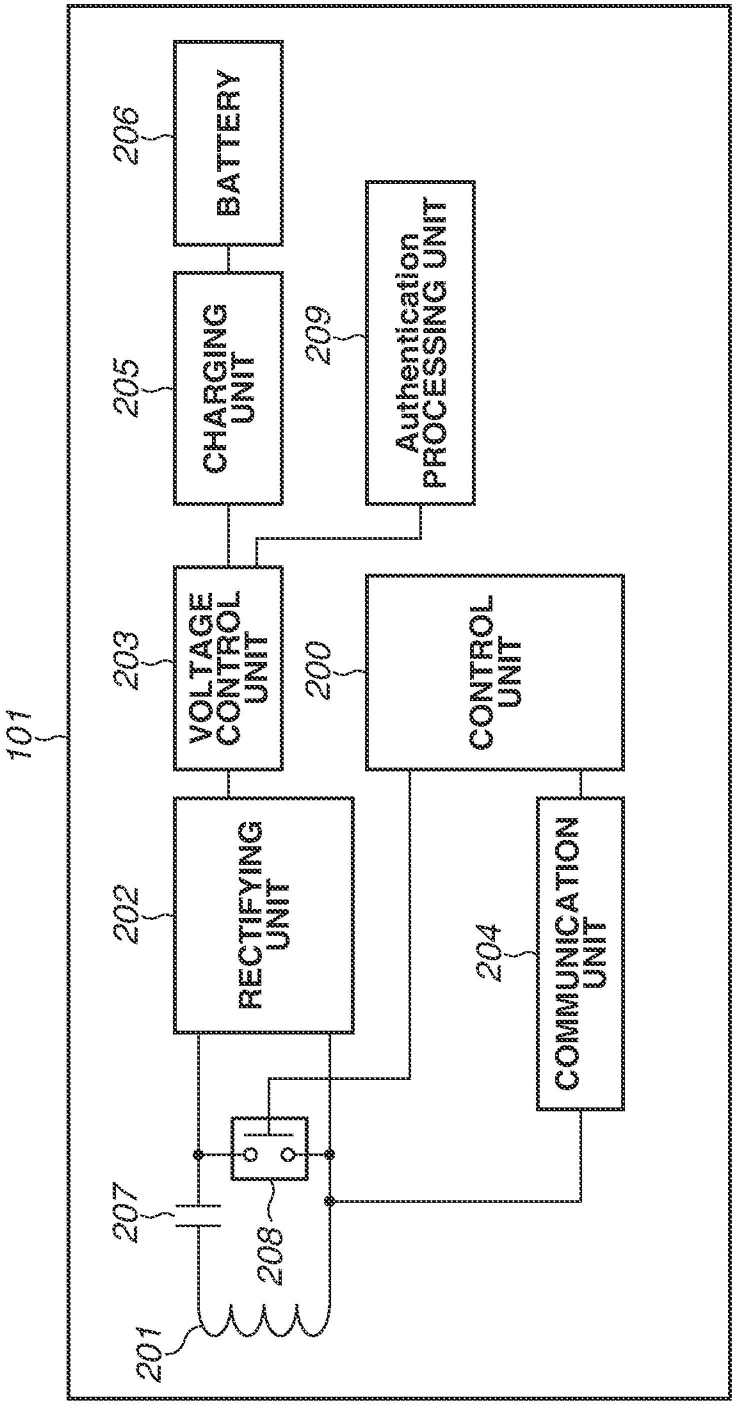
FIG. 2 is a diagram illustrating a functional configuration of a power receiving apparatus.

FIG. 2 illustrates a configuration example of the power receiving apparatus 101. The power receiving apparatus 101 in the present exemplary embodiment includes a control unit 200, a power receiving coil 201, a rectifying unit 202, a voltage control unit 203, a communication unit 204, a charging unit 205, a battery 206, a resonance capacitor 207, and a switch 208. Hereinafter, each processing unit will be described.

The control unit 200 controls the entire power receiving apparatus 101. The control unit 200 includes one or more processors such as a central processing unit (CPU) or a micro processing unit (MPU). In addition, the control unit 200 may include one or more storage devices such as a random access memory (RAM) or a read only memory (ROM). Then, the control unit 200 can be configured to execute each piece of processing to be described below, by executing a program stored in a storage device, for example, using a processor.

The power receiving coil 201 is a coil to be used when power is received from a power transmission coil 303 of the power transmission apparatus 100. The rectifying unit 202 converts an alternating-current voltage and an alternating current received via the power receiving coil 201, into a direct-current voltage and a direct current. The voltage control unit 203 converts the level of a direct-current voltage input from the rectifying unit 202, into the level of a direct-current voltage suitable (neither too big nor too small) to operate the control unit 200, the charging unit 205, and the like. Further, the voltage control unit 203 supplies the voltage at the converted level to the charging unit 205. That is, using power received from the power transmission apparatus 100, the voltage control unit 203 outputs power to the charging unit 205 and the battery 206, which serve as a load included in itself.

The charging unit 205 charges the battery 206 using a voltage supplied from the voltage control unit 203. The communication unit 204 performs control communication related to wireless power transmission that is based on the WPC standard, with the power transmission apparatus 100. The control communication is performed by load-modulating an alternating-current voltage and an alternating current received by the power receiving coil 201.

Further, the power receiving coil 201 is connected with the resonance capacitor 207, and is configured to resonate at a specific frequency F2. The switch 208 is a switch for short-circuiting the power receiving coil 201 and the resonance capacitor 207, and is controlled by the control unit 200. When the switch 208 is turned on, the power receiving coil 201 and the resonance capacitor 207 form a serial resonance circuit. At this time, a current flows only to a closed circuit of the power receiving coil 201, the resonance capacitor 207, and the switch 208, and a current stops flowing to the rectifying unit 202 and the voltage control unit 203. In contrast to this, if the switch 208 is turned off, a current starts to flow to the rectifying unit 202 and the voltage control unit 203 via the power receiving coil 201 and the resonance capacitor 207.

Figure 3:
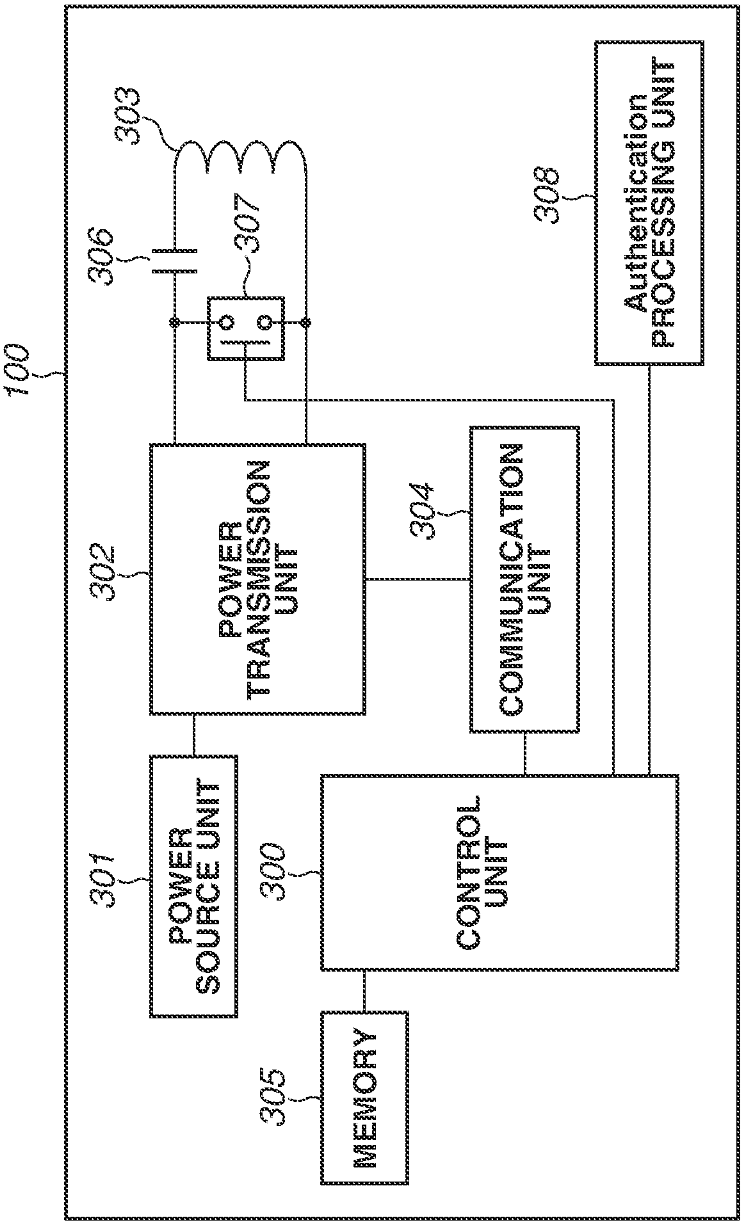
FIG. 3 is a diagram illustrating a functional configuration of a power transmission apparatus.

FIG. 3 illustrates a configuration example of the power transmission apparatus 100. The power transmission apparatus 100 in the present exemplary embodiment includes a control unit 300, a power source unit 301, a power transmission unit 302, the power transmission coil 303, a communication unit 304, a memory 305, a resonance capacitor 306, and a switch 307. Hereinafter, each processing unit will be described.

The control unit 300 controls the entire power transmission apparatus 100. The control unit 300 includes one or more processors such as a CPU or an MPU. In addition, the control unit 300 can be configured to execute each piece of processing to be described below, by executing a program stored in the memory 305 to be described below or a storage device included in the control unit 300, for example, using a processor. The power source unit 301 supplies power to each functional block. The power source unit 301 is a commercial power source or a battery, for example. Power supplied from a commercial power source, for example, can be stored into the battery.

The power transmission unit 302 converts direct-current or alternating-current power input from the power source unit 301, into alternating-current power in a frequency band to be used for wireless power transmission, and inputs the alternating current power to the power transmission coil 303. The power transmission unit 302 thereby produces electromagnetic waves to cause the power receiving apparatus 101 to receive power, from the power transmission coil 303. For example, the power transmission unit 302 converts a direct-current voltage supplied by the power source unit 301, into an alternating-current voltage using a switching circuit having a half-bridge or full-bridge configuration that uses a Field Effect Transistor (FET). In this case, the power transmission unit 302 includes a gate driver that controls ON/OFF of the FET.

Further, by adjusting at least either of a voltage (transmission voltage) and a current (transmission current) to be input to the power transmission coil 303, or a frequency, the power transmission unit 302 controls the intensity and the frequency of electromagnetic waves to be output. For example, by increasing a transmission voltage or a transmission current, the power transmission unit 302 increases the intensity of electromagnetic waves, and by decreasing a transmission voltage or a transmission current, the power transmission unit 302 decreases the intensity of electromagnetic waves. Here, the power transmission unit 302 is assumed to have capability of supplying power enough to output at least 15-watt (W) power to the charging unit 205 of the power receiving apparatus 101 that complies with the WPC standard. Further, based on an instruction from the control unit 300, the power transmission unit 302 performs output control of alternating-current power in such a manner as to cause the power transmission coil 303 to start or stop the output of electromagnetic waves.

The communication unit 304 performs communication for power transmission control that is based on the WPC standard, with the power receiving apparatus 101 via the power transmission coil 303. The communication unit 304 modulates an alternating-current voltage and an alternating current output from the power transmission unit 302, using frequency modulation (Frequency Shift Keying (FSK)), and transmits information to the power receiving apparatus 101. Further, the communication unit 304 demodulates the alternating-current voltage and the alternating current modulated by load modulation executed by the communication unit 204 of the power receiving apparatus 101, and acquires information transmitted by the power receiving apparatus 101. That is, by superimposing information to be transmitted to the power receiving apparatus 101, onto electromagnetic waves transmitted from the power transmission unit 302, and detecting a received signal superimposed on the electromagnetic waves by the power receiving apparatus 101, the communication unit 304 communicates with the power receiving apparatus 101.

In addition, the communication unit 304 may communicate with the power receiving apparatus 101 in compliance with a standard different from the WPC standard, using a coil (or antenna) different from the power transmission coil 303. Further, the communication unit 304 may communicate with the power receiving apparatus 101 using selectively a plurality of communication functions. The memory 305 stores, for example, control programs to be executed by the control unit 300, and information such as states of the power transmission apparatus 100 and the power receiving apparatus 101. For example, the state of the power transmission apparatus 100 is acquired by the control unit 300. Further, the state of the power receiving apparatus 101 is acquired by the control unit 200 of the power receiving apparatus 101 and transmitted from the communication unit 204, and the power transmission apparatus 100 acquires the information indicating the state, via the communication unit 304.

Further, the power transmission coil 303 is connected with the resonance capacitor 306, and is configured to resonate at a specific frequency F1. The switch 307 is a switch for short-circuiting the power transmission coil 303 and the resonance capacitor 306, and is controlled by the control unit 300. When the switch 307 is turned on, the power transmission coil 303 and the resonance capacitor 306 form a serial resonance circuit. At this time, a current flows only to a closed circuit of the power transmission coil 303, the resonance capacitor 306, and the switch 307. If the switch 307 is turned off, power is supplied from the power transmission unit 302 to the power transmission coil 303 and the resonance capacitor 306.

Figure 4:
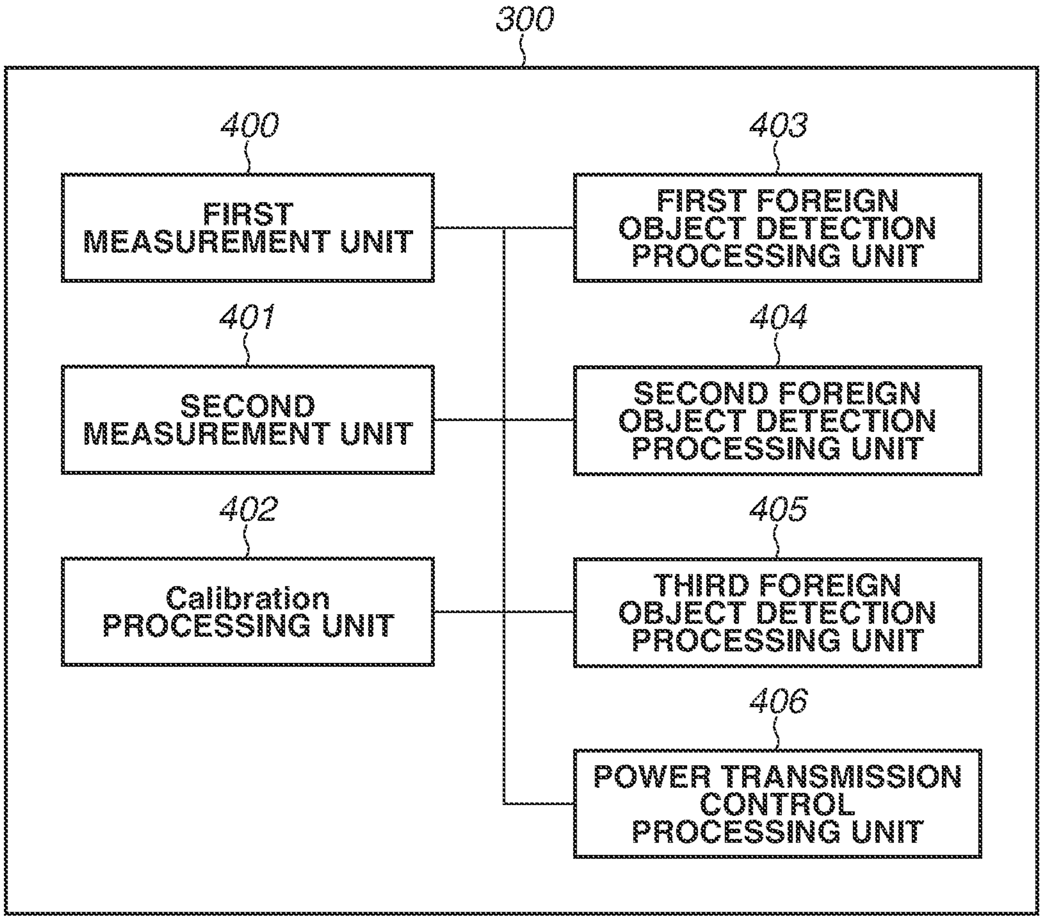
FIG. 4 is a diagram illustrating a function of a control unit of a power transmission apparatus.

FIG. 4 illustrates a functional configuration example implemented by the control unit 300 of the power transmission apparatus 100. The control unit 300 in the present exemplary embodiment can operate as a first measurement unit 400, a second measurement unit 401, a Calibration processing unit 402, a first foreign object detection processing unit 403, a second foreign object detection processing unit 404, a third foreign object detection processing unit 405, and a power transmission processing unit 406.

The first measurement unit 400 performs the measurement of a Q-value (first Q-value) in a frequency domain. The second measurement unit 401 performs the measurement of a Q-value (second Q-value) in a time domain. The Calibration processing unit 402 performs the acquisition of a Calibration data Point and Calibration curve creation processing. The details of these pieces of processing will be described below.

The first foreign object detection processing unit 403 executes foreign object detection processing (first foreign object detection processing) that is based on the first Q-value measured by the first measurement unit 400. The second foreign object detection processing unit 404 executes foreign object detection processing (second foreign object detection processing) that is based on a power loss method. The third foreign object detection processing unit 405 executes foreign object detection processing (third foreign object detection processing) that is based on the second Q-value measured by the second measurement unit 401. The details of the above described foreign object detection processing will also to be described below. In addition, a “foreign object” in the present exemplary embodiment refers to an object different from a power receiving apparatus to which power is to be transmitted from a power transmission apparatus. Further, foreign object detection refers to processing for determining whether a foreign object exists within a power transmission executable range of a power transmission apparatus. In addition, among an object of a part essential to a power receiving apparatus, an object of a part essential to a product into which a power receiving apparatus is incorporated, an object of a part essential to a power transmission apparatus, and an object of a part essential to a product into which a power transmission apparatus is incorporated, an object that might unintentionally produce heat when being exposed to wireless power transmitted by a power transmission antenna is not regarded as a foreign object.

The power transmission processing unit 406 performs processing related to power transmission start and power transmission stop of the power transmission unit 302, and increase and decrease of transmitted power. The processing units illustrated in FIG. 4 are formed as a plurality of independent programs, for example, and by event processing or the like, can concurrently operate while taking synchronization between the plurality of programs.

(Description of Foreign Object Detection Processing)

Foreign object detection processing to be performed by each of the first foreign object detection processing unit 403, the second foreign object detection processing unit 404, the third foreign object detection processing unit 405 will be described. Here, the power transmission apparatus 100 and the power receiving apparatus 101 will be described as an example. In addition, a flow of the entire processing to be performed by the power transmission apparatus 100 and the power receiving apparatus 101 will be described below. Here, the description of a part related to foreign object detection processing will be given.

(1) Foreign Object Detection Processing That Is Based on Q-Value Measured in Frequency Domain (First Foreign Object Detection Processing)

The first foreign object detection processing is performed by the first foreign object detection processing unit 403. The first foreign object detection processing to be described here is assumed to be foreign object detection processing complying with the WPC standard.

In the first foreign object detection processing, first of all, the first measurement unit 400 of the power transmission apparatus 100 performs measurement (first Q-value measurement) in a frequency domain of a Q-value changing due to the influence of a foreign object. The measurement is executed between a timing at which the power transmission apparatus 100 transmits Analog Ping, and a timing at which the power transmission apparatus 100 transmits Digital Ping.

For example, to measure a Q-value, the power transmission unit 302 sweeps a frequency of wireless power output by the power transmission coil 303, and the first measurement unit 400 measures a voltage value at the end of the resonance capacitor 306 connected in series (or in parallel) with the power transmission coil. Then, the first measurement unit 400 searches for a resonance frequency at which the voltage value becomes peak, and calculates a Q-value (first Q-value) of the power transmission coil 303 from a frequency indicating a voltage value lower by 3 dB from the peak voltage value measured at the resonance frequency, and a resonance frequency thereof.

In addition, the first measurement unit 400 may measure a Q-value using another method. For example, the power transmission unit 302 sweeps a frequency of wireless power output by the power transmission coil 303, and the first measurement unit 400 measures a voltage value at the end of the resonance capacitor 306 connected in series with the power transmission coil 303, and searches for a resonance frequency at which the voltage value becomes peak. Then, the first measurement unit 400 measures voltage values at both ends of the resonance capacitor 306 at the resonance frequency, and calculates a Q-value of the power transmission coil 303 from a ratio of the voltage values at both ends.

Further, the first foreign object detection processing unit 403 of the power transmission apparatus 100 acquires a Q-value to be used as a determination criterion of foreign object detection, from the power receiving apparatus 101 via the communication unit 304. For example, the first foreign object detection processing unit 403 receives, from the power receiving apparatus 101, a Q-value (characteristic value) of a certain power transmission coil defined in the WPC standard that is obtainable in a case where a power receiving apparatus is placed on the power transmission coil. This characteristic value is stored in a Foreign Object Detection (FOD) Status packet to be transmitted by the power receiving apparatus 101, and the power transmission apparatus 100 acquires this characteristic value by receiving this FOD Status packet.

The first foreign object detection processing unit 403 estimates a Q-value of the power transmission coil 303 that is obtainable in a case where the power receiving apparatus 101 is placed on the power transmission apparatus 100, from the acquired characteristic value. In the present exemplary embodiment, the estimated Q-value will be referred to as a reference Q-value. In addition, a Q-value (characteristic value) stored in the FOD Status packet can be prestored in a nonvolatile memory (not illustrated) of the power receiving apparatus 101. That is, the power receiving apparatus 101 can notify the power transmission apparatus 100 of a prestored Q-value.

The first foreign object detection processing unit 403 of the power transmission apparatus 100 compares the reference Q-value and the Q-value measured by the first measurement unit 400, and determines the existence or nonexistence of a foreign object based on a comparison result. For example, the first foreign object detection processing unit 403 sets a Q-value lower by a % (predetermined percentage) than the reference Q-value as a threshold value, and in a case where a measured Q-value is lower than the threshold value, determines that there is a high possibility that a foreign object exists. Further, in a case where the measured Q-value is higher than the threshold value, the first foreign object detection processing unit 403 determines that there is a low possibility that a foreign object exists (there is a high possibility that no foreign object exists).

(2) Foreign Object Detection Processing That Is Based on Power Loss Method (Second Foreign Object Detection Processing)

The second foreign object detection processing is performed by the second foreign object detection processing unit 404. The second foreign object detection processing to be described here is assumed to be a power loss method complying with the WPC standard.

Figure 11:
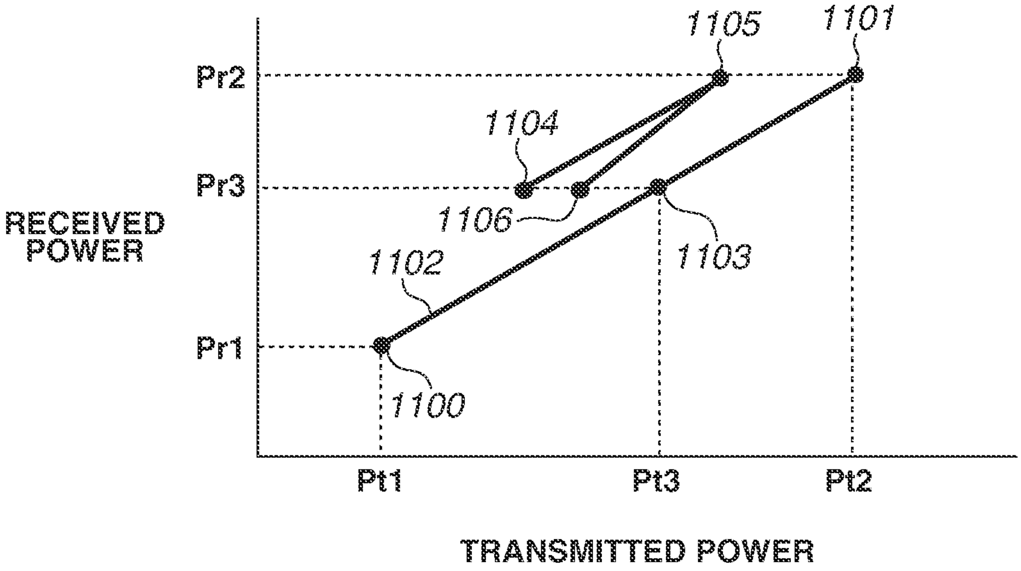
FIG. 11 is a diagram illustrating foreign object detection that uses a power loss method.

FIG. 11 is a conceptual diagram of foreign object detection that uses the power loss method, and a horizontal axis indicates transmitted power of the power transmission apparatus 100 and a vertical axis indicates received power of the power receiving apparatus 101. In addition, the control of transmitted power transmitted by the power transmission unit 302 of the power transmission apparatus 100 can be performed by the power transmission processing unit 406. First of all, processing (Calibration processing) for acquiring data to be used in foreign object detection will be described.

The power transmission unit 302 of the power transmission apparatus 100 transmits Digital Ping to the power receiving apparatus 101. Then, the communication unit 304 of the power transmission apparatus 100 receives a received power value Pr1 (referred to as Light Load) in the power receiving apparatus 101 using a Received Power Packet (mode1). In addition, hereinafter, the Received Power Packet (mode1) will be referred to as an "RP1". The RP1 is a received power value obtainable in a case where the power receiving apparatus 101 does not supply received power to the load (the charging unit 205 and the battery 206). The control unit 300 of the power transmission apparatus 100 stores, into the memory 305, a relationship (point 1100 in FIG. 11) between the received RP1 and a transmitted power value Pt1 obtained when the RP1 is obtained. The power transmission apparatus 100 can thereby recognize that a power loss amount between the power transmission apparatus 100 and the power receiving apparatus 101 that is obtained when power at the transmitted power value Pt1 is transmitted as transmitted power is Pt1−RP1 (Ploss1).

Next, the communication unit 304 of the power transmission apparatus 100 receives, from the power receiving apparatus 101, a value of a received power value Pr2 (referred to as Connected Load) in the power receiving apparatus 101 using a Received Power Packet (mode2). In addition, hereinafter, the Received Power Packet (mode2) will be referred to as an "RP2". The Pr2 is a received power value obtainable in a case where the power receiving apparatus 101 supplies received power to the load. Then, the control unit 300 of the power transmission apparatus 100 stores, into the memory 305, a relationship (point 1101 in FIG. 11) between the received Pr2 and a transmitted power value Pt2 obtained when the Pr2 is obtained. The power transmission apparatus 100 can thereby recognize that a power loss amount between the power transmission apparatus 100 and the power receiving apparatus 101 that is obtained when power at the transmitted power value Pt2 is transmitted as transmitted power is Pt2−Pr2 (Ploss2).

The Calibration processing unit 402 of the power transmission apparatus 100 linearly interpolates between the point 1100 and the point 1101, and creates a straight line 1102. The straight line 1102 corresponds to a relationship between transmitted power and received power in a state in which no foreign object exists near the power transmission apparatus 100 and the power receiving apparatus 101. Thus, the power transmission apparatus 100 can predict received power to be received in a state in which there is a high possibility that no foreign object exists, from a transmitted power value and the straight line 1102. For example, in a case where a transmitted power value is Pt3, the power transmission apparatus 100 can predict that a received power value obtainable when no foreign object exists is Pr3, from a point 1103 on the straight line 1102 that corresponds to the case where a transmitted power value is Pt3. In this manner, processing of deriving a relationship between transmitted power and received power in a state in which no foreign object exists near the power transmission apparatus 100 and the power receiving apparatus 101 is Calibration processing.

An example of performing foreign object detection based on data obtained by the Calibration processing will be described below. For example, in a case where the power transmission unit 302 of the power transmission apparatus 100 has transmitted power to the power receiving apparatus 101 with transmitted power having the transmitted power value Pt3, the communication unit 304 has received a value of a received power value Pr3' from the power receiving apparatus 101. From the received power value Pr3 in a state in which no foreign object exists, the second foreign object detection processing unit 404 of the power transmission apparatus 100 calculates a value Pr3−Pr3' (=Ploss_FO) obtained by subtracting the received power value Pr3' actually received from the power receiving apparatus 101. This Ploss_FO can be considered to be power loss to be consumed by a foreign object existing between the power transmission apparatus 100 and the power receiving apparatus 101 in a case where the foreign object exists therebetween. Thus, in a case where the power Ploss_FO predicted to be consumed by a foreign object exceeds a predetermined threshold value, the second foreign object detection processing unit 404 can determine that a foreign object exists. This threshold value is derived based on a measurement error and a relationship between the point 1100 and the point 1101, for example. In this manner, foreign object detection (second foreign object detection) that is based on the power loss method is implemented.

Further, the second foreign object detection processing unit 404 of the power transmission apparatus 100 preliminarily obtains a power loss amount Pt3–Pr3 (Ploss3) between the power transmission apparatus 100 and the power receiving apparatus 101 from the received power value Pr3 in the state in which no foreign object exists. Then, the second foreign object detection processing unit 404 calculates a power loss amount Pt3–Pr3' (Ploss3') between the power transmission apparatus 100 and the power receiving apparatus 101 in a state in which a foreign object exists, from the received power value Pr3' received from the power receiving apparatus 101 in a state in which it is unknown whether a foreign object exists. Then, the second foreign object detection processing unit 404 calculates Ploss3'–Ploss3, and in a case where this value exceeds a predetermined threshold value, can determine that a foreign object exists. In addition, Ploss3'–Ploss3=Pt3–Pr3'–Pt3+Pr3=Pr3–Pr3' is satisfied. Thus, by the compassion of power loss amounts, power Ploss_FO predicted to be consumed by a foreign object can also be estimated.

As described above, the power Ploss_FO predicted to be consumed by a foreign object may be calculated as a difference Pr3–Pr3' in received power, or may be calculated as a difference Ploss3'–Ploss3 (=Ploss_FO) in power loss.

After the straight line 1102 has been acquired by the Calibration processing unit 402, the second foreign object detection processing unit 404 of the power transmission apparatus 100 periodically receives a current received power value (for example, the above-described Pr3') from the power receiving apparatus 101 via the communication unit 304. A current received power value periodically transmitted by the power receiving apparatus 101 is transmitted to the power transmission apparatus 100 as a Received Power Packet (mode0). The second foreign object detection processing unit 404 of the power transmission apparatus 100 performs foreign object detection based on a received power value stored in the Received Power Packet (mode0), and the straight line 1102. In addition, hereinafter, a Received Power Packet (mode0) will be referred to as an "RP0". Then, a received power value stored in a Received Power Packet (RP1, RP2), and a transmitted power value corresponding to the received power value will be referred to as Calibration data.

Further, in the present exemplary embodiment, the point 1100 and the point 1101 for acquiring the straight line 1102 indicating a relationship between transmitted power and received power in a state in which no foreign object exists near the power transmission apparatus 100 and the power receiving apparatus 101 will be referred to as "Calibration data Points". Further, a line segment (straight line 1102) acquired by interpolating between at least two Calibration data Points will be referred to as a "Calibration curve". The Calibration data Point and the Calibration curve are to be used for foreign object detection processing to be executed by the second foreign object detection processing unit 404.

(3) Foreign Object Detection Processing That Is Based on Q-Value Measured in Time Domain (Third Foreign Object Detection Processing)

The third foreign object detection processing is performed by the third foreign object detection processing unit 405. The third foreign object detection processing will be described with reference to FIGS. 10A and 10B.

Figure 10A:
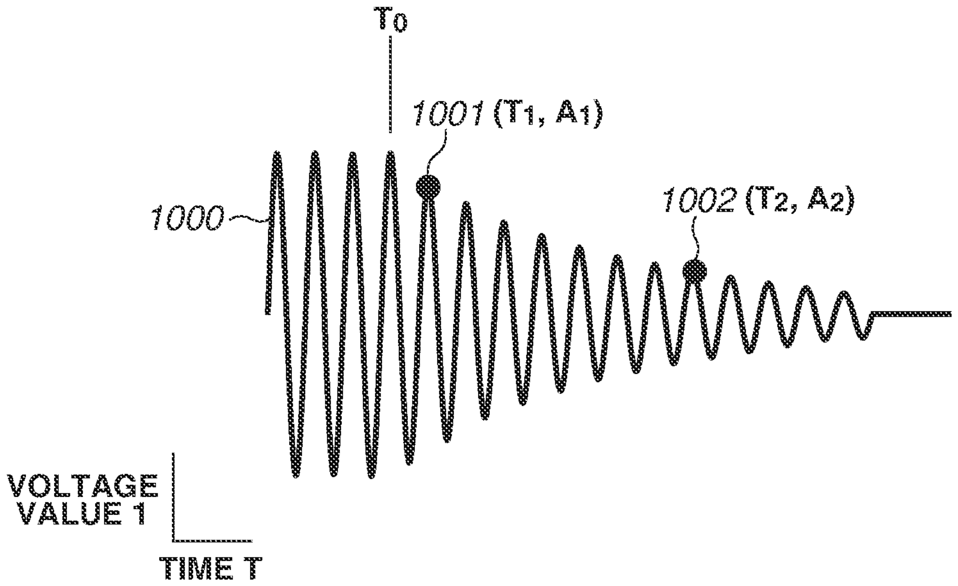
FIG. 10A is a diagram illustrating a measurement method of a Q-value in a time domain.
Figure 10B:
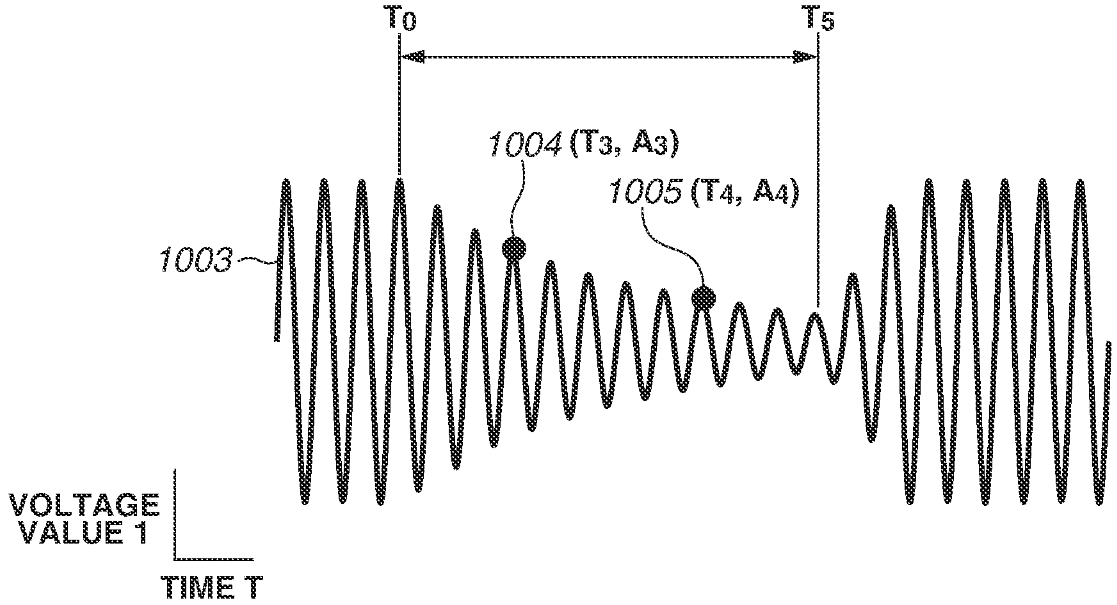
FIG. 10B is a diagram illustrating a measurement method of a Q-value in a time domain.

FIGS. 10A and 10B are conceptual diagrams illustrating a measurement method of a Q-value (second Q-value) in a time domain. In the present exemplary embodiment, a foreign object detection method that is based on the second Q-value will be referred to as a third foreign object detection method. The second Q-value measurement is performed by the second measurement unit 401. Further, the control of transmitted power transmitted by the power transmission unit 302 of the power transmission apparatus 100 is performed by the power transmission processing unit 406. In the second Q-value measurement, the power transmission apparatus 100 and the power receiving apparatus 101 instantaneously interrupts power transmission by turning on the switches during the same period, and then prevent received power from being output to the load. Accordingly, a voltage to be applied to a coil, for example, exponentially decreases. Then, the second Q-value is calculated based on a way of this decrease.

A waveform 1000 in FIG. 10A indicates time passage of a value of a high-frequency voltage to be applied to the end of the power transmission coil 303 or the resonance capacitor 306 of the power transmission apparatus 100 (hereinafter, will be simply referred to as a "voltage value of a power transmission coil"). In addition, in FIGS. 10A and 10B, a horizontal axis indicates a time and a vertical axis indicates a voltage value. At a time T0, the application of a high-frequency voltage (power transmission) is stopped. A point 1001 is one point on an envelope curve of high-frequency voltages (i.e., one point of a maximal value), and indicates a high-frequency voltage at a time $T_1$. In FIG. 10A, ($T_1$, $A_1$) indicates that a voltage value at the time $T_1$ is $A_1$. Similarly, a point 1002 is one point on an envelope curve of high-frequency voltages, and indicates a high-frequency voltage at a time $T_2$. In FIG. 10A, ($T_2$, $A_2$) indicates that a voltage value at the time $T_2$ is $A_2$.

The second Q-value measurement is executed based on a temporal change of a voltage value at the time TO or later. For example, a Q-value is calculated using Equation 1 based on times and voltage values of the point 1001 and the point 1002 that form an envelope curve of voltage values, and a frequency f of a high-frequency voltage (hereinafter, f will be referred to as an operating frequency.).

$$Q = \pi f \frac{t_2 - t_1}{\ln\left(\frac{A_1}{A_2}\right)} \quad \text{[Equation 1]}$$

That is, a Q-value here indicates an electrical property defined based on a relationship between an elapsed time of the power transmission coil 303 that is obtainable after power transmission is restricted (stopped), and a voltage drop amount obtainable at the time.

Next, processing for the power transmission apparatus 100 measuring a Q-value in a time domain in the present exemplary embodiment will be described with reference to FIG. 10B. A waveform 1003 indicates a value of a high-frequency voltage to be applied to the power transmission coil 303, and the frequency is a frequency between 100 kHz and 148.5 kHz used in a Qi standard. Further, points 1004 and 1005 constitute a part of an envelope curve of voltage values. The power transmission unit 302 of the power transmission apparatus 100 stops power transmission during a section from a time $T_0$ to a time $T_5$. The second measurement unit 401 of the power transmission apparatus 100 measures a Q-value based on a voltage value $A_3$ (point 1004) at a time $T_3$, a voltage value $A_4$ (point 1005) at a time $T_4$, and an operating frequency of a high-frequency voltage (Equation 1). In addition, the power transmission unit 302 of the power transmission apparatus 100 restarts power transmission at the time $T_5$. In this manner, the second Q-value measurement is performed by the power transmission apparatus 100 instantaneously interrupting power transmission and measuring a Q-value based on time passage, voltage values, and an operating frequency. In addition, also in the power receiving apparatus 101, a second Q-value can be similarly measured as an electrical property defined based on a relationship between an elapsed time of the power receiving coil 201 that is obtainable after power transmission is restricted (stopped), and a voltage drop amount obtainable at the time. In this manner, a method of measuring a Q-value based on voltage values at at least two time points in a predetermined period during which power transmission is restricted will be referred to as a Q-value measurement method that uses a waveform attenuation method. In addition, voltage values at three or more time points in the predetermined period may be measured.

Further, the third foreign object detection processing unit 405 of the power transmission apparatus 100 compares the reference Q-value and a Q-value measured by the second measurement unit 401, and determines the existence or non-existence of a foreign object based on a comparison result. For example, the third foreign object detection processing unit 405 sets a Q-value lower by a % (predetermined percentage) than the reference Q-value as a threshold value, and in a case where a measured Q-value is lower than the threshold value, determines that there is a high possibility that a foreign object exists. Further, in a case where the measured Q-value is higher than the threshold value, the third foreign object detection processing unit 405 determines that there is a low possibility that a foreign object exists (there is a high possibility that no foreign object exists).

In the above-described example, by the power transmission apparatus 100 instantaneously interrupting (stopping) power transmission, the measurement of the second Q-value is performed, but a measurement method is not limited to this. For example, a configuration of measuring a second Q-value by the power transmission apparatus 100 restricting power transmission in such a manner as to change power transmission to a value smaller by a predetermined value may be employed. Further, in the above-described example, voltage values are used in the calculation of the second Q-value, but current values may be used. In this case, vertical axes in the graphs in FIGS. 10A and 10B are assumed to indicate current values, and the second Q-value is measured based on a way of decrease in current value.

(Processing Flow in Present Exemplary Embodiment)

The power transmission apparatus 100 and the power receiving apparatus 101 in the present exemplary embodiment perform processing in which processing complying with the WPC standard and the third foreign object detection processing are combined. A processing flow will be described with reference to FIG. 6A.

To detect an object existing near the power transmission coil 303, the power transmission apparatus 100 transmits Analog Ping (F600). The Analog Ping is pulsed power, and is power for detecting an object. Further, the Analog Ping is so small power that the power receiving apparatus 101 cannot activate the control unit 200 if the power receiving apparatus 101 receives the Analog Ping.

Using the Analog Ping, the power transmission apparatus 100 detects an object based on a shift in resonance frequency of a voltage value in the power transmission coil 303 that is attributed to an object existing near the power transmission coil 303, or a change in a value of voltage/current flowing in the power transmission coil 303. If the power transmission apparatus 100 detects an object using the Analog Ping, the power transmission apparatus 100 measures a Q-value of the power transmission coil 303 by the above-described first Q-value measurement (F601). Then, the power transmission apparatus 100 starts the transmission of Digital Ping subsequently to the first Q-value measurement (F602). The Digital Ping is power for activating the control unit 200 of the power receiving apparatus 101, and is power lager than the Analog Ping. Further, the Digital Ping is thereafter transmitted continuously. That is, the power transmission apparatus 100 continue to transmit power equal to or larger than the Digital Ping since the transmission of the Digital Ping has been started (F602), until an End Power Transfer (EPT) packet to be described below is received from the power receiving apparatus 101 (F633).

If the power receiving apparatus 101 receives the Digital Ping and is activated, the power receiving apparatus 101 stores a voltage value of the received Digital Ping into a Signal Strength packet, and transmits the Signal Strength packet to the power transmission apparatus 100 (F603). Subsequently, the power receiving apparatus 101 transmits, to the power transmission apparatus 100, an ID packet storing an ID including version information of the WPC standard with which the power receiving apparatus 101 complies, and device identification information (F604). Furthermore, the power receiving apparatus 101 transmits, to the power transmission apparatus 100, a Configuration packet including information such as a maximum value of power to be supplied by the voltage control unit 203 to the load (the charging unit 205) (F605). Here, the power receiving apparatus 101 of the present exemplary embodiment is assumed to have capability of supplying power up to 15 watt to the load.

The power transmission apparatus 100 receives the ID packet and the Configuration packet. Then, if the power transmission apparatus 100 determines, based on these packets, that the power receiving apparatus 101 supports an expanded protocol of a version equal to or later than the WPC standard v1.2 (including Negotiation to be described below), the power transmission apparatus 100 transmits acknowledge (ACK) as a response (F606).

If the power receiving apparatus 101 receives the ACK, the power receiving apparatus 101 transitions to a Negotiation phase in which the negotiation of power to be transmitted and received is performed. First of all, the power receiving apparatus 101 transmits an FOD Status packet to the power transmission apparatus 100 (F607). In the present exemplary embodiment, this FOD Status packet will be referred to as an "FOD (Q1)". The power transmission apparatus 100 performs foreign object detection using a first foreign object detection method based on a Q-value (the characteristic value) stored in the received FOD (Q1), and a Q-value measured by the first Q-value measurement. Then, in a case where the power transmission apparatus 100 determines that there is a high possibility that no foreign object exists, the power transmission apparatus 100 transmits ACK indicating the determination result, to the power receiving apparatus 101 (F608).

If the power receiving apparatus 101 receives the ACK, the power receiving apparatus 101 performs the negotiation of Guaranteed Power (GP) being a maximum value of a value of power requested to be received. The Guaranteed Power indicates load power of the power receiving apparatus 101 (power to be consumed by the battery 206), or a value of power guaranteed to be able to be supplied to the load by the power receiving apparatus 101, which have been agreed between itself and the power transmission apparatus 100. This negotiation is implemented by the power receiving apparatus 101 transmitting, to the power transmission apparatus 100, a packet storing a value of requested Guaranteed Power among Specific Requests defined in the WPC standard (F609). In the present exemplary embodiment, this packet will be referred to as an "SRQ (GP)". The power transmission apparatus 100 responds to the SRQ (GP) considering the power transmission capability of itself or the like. In a case where the power transmission apparatus 100 determines that the Guaranteed Power is acceptable, the power transmission apparatus 100 transmits ACK indicating that the request has been accepted (F610). In the present exemplary embodiment, because the validity of the power transmission apparatus 100 has not been confirmed by Authentication to be described below, the power receiving apparatus 101 has requested not 15 watt but 5 watt as Guaranteed Power using the SRQ (GP).

If the negotiation of a plurality of parameters including Guaranteed Power ends, the power receiving apparatus 101 transmits "SRQ (EN)" requesting the end of negotiation (End Negotiation) among Specific Requests, to the power transmission apparatus (F611). Then, the power transmission apparatus 100 transmits ACK in response to the SRQ (EN) (F612), ends Negotiation, and transitions to a Power Transfer phase in which transmission and reception of power defined by Guaranteed Power are performed.

Subsequently, the power transmission apparatus 100 creates a Calibration curve to execute the above-described foreign object detection (second foreign object detection method) that is based on the power loss method.

Here, the case of executing the third foreign object detection in the Calibration processing will be described. An information element requesting the power transmission apparatus 100 to execute the second Q-value measurement, is included in a reserved domain of the Received Power Packet transmitted by the power receiving apparatus 101. For example, a field of 1 bit that indicates whether to request the second Q-value measurement is provided in the reserved domain. Then, the power receiving apparatus 101 stores "1" into the bit in the case of requesting the second Q-value measurement, and stores "0" thereinto in the case of not requesting the second Q-value measurement. In the present exemplary embodiment, this bit will be referred to as a "request bit". In the present exemplary embodiment, an RP1 in which "1" is stored in the request bit is represented as an RP1 (FOD). In addition, a configuration of storing "0" in the case of requesting the second Q-value measurement, and storing "1" in the case of not requesting the second Q-value measurement may be employed.

The power receiving apparatus 101 transmits the RP1 (FOD) to the power transmission apparatus 100 (F613). If the power transmission apparatus 100 receives the RP1 (FOD), the power transmission apparatus 100 executes the second Q-value measurement (F614).

The power transmission apparatus 100 determines whether a transmitted power value within a period of a period $T_{window}$ ending before a time $T_{offset}$, from a time at which the head of the Received Power Packet is received is stable (fluctuation is equal to or smaller than a specific threshold value). Further, the power transmission apparatus 100 determines whether an integer stored in a CE is smaller than a specific value. Further, the power transmission apparatus 100 acquires a result of the third foreign object detection processing that is based on a value of the measured second Q-value. The power transmission apparatus 100 determines a response to an RP1 or an RP2 to be described below, based on at least of these determination results and a result of the third foreign object detection processing.

Here, the power transmission apparatus 100 determines that a transmitted power value is stable and there is a high possibility that a foreign object has not been detected by the third foreign object detection. In this case, the power transmission apparatus 100 makes a determination so as to accept (use) a received power value stored in the RP1 (FOD), and a transmitted power value obtained when the received power is obtained, as a Calibration data Point (corresponding to the point 1100 in FIG. 11). In a case where the power transmission apparatus 100 makes a determination so as to use the values, the power transmission apparatus 100 transmits ACK to the power receiving apparatus 101 (F619). In addition, in a case where the power transmission apparatus 100 makes a determination so as not to use (accept) the values, the power transmission apparatus 100 transmits negative acknowledge (NAK) to the power receiving apparatus 101.

The power receiving apparatus 101 transmits, to the power transmission apparatus 100, a Control Error Packet (hereinafter, will be represented as CE) requesting the power transmission apparatus 100 to increase or decrease receiving voltage (or receiving current, received power) (F616). In the case of requesting an increase in receiving voltage, an integer with a sign "+" is stored in the CE, in the case of requesting a decrease in receiving voltage, an integer with a sign "−" is stored in the CE, and when a current receiving voltage is desired to be maintained, "0" is stored in the CE. Based on a sign and an integer stored in the CE, the power transmission apparatus 100 promptly performs power transmission control. Specifically, in a case where an integer with a sign "+" is stored, the power transmission apparatus 100 promptly increases a transmission voltage, in a case where an integer with a sign "−" is stored, the power transmission apparatus 100 promptly decreases a transmission voltage, and in a case where "0" is stored, the power transmission apparatus 100 maintains a transmission voltage. Further, in the present exemplary embodiment, a CE in which an integer with a sign "+" is stored will be referred to as a CE (+), a CE in which an integer with a sign "−" is stored will be referred to as a CE (−), and a CE in which "0" is stored will be referred to as a CE (0).

The power receiving apparatus 101 transmits a CE (+) indicating that power is to be increased, to the power transmission apparatus 100 (F616). If the power transmission apparatus 100 receives the CE (+), the power transmission apparatus 100 changes a setting value of the power transmission unit 302 and increases transmitted power. If received power increases in response to the CE (+), the power receiving apparatus 101 supplies the received power to the load (the charging unit 205 and the battery 206).

Subsequently, the power receiving apparatus 101 transmits an RP2 (FOD) in which "1" is stored in a request bit, to the power transmission apparatus 100 (F617). The power transmission apparatus 100 executes the second Q-value measurement (F618), and determines that there is a high possibility that a foreign object has not been detected by the third foreign object detection. Then, the power transmission apparatus 100 makes a determination so as to accept (use) a received power value stored in the RP2 (FOD), and a transmitted power value of the power transmission apparatus 100 that is obtained when the received power is obtained, as a Calibration data Point (corresponding to the point 1101 in FIG. 11). The power transmission apparatus 100 transmits ACK to the power receiving apparatus 101 (F619).

The power receiving apparatus 101 transmits a CE (+) to the power transmission apparatus 100 (F620). If the power transmission apparatus 100 receives the CE (+), the power transmission apparatus 100 changes a setting value of the power transmission unit 302 and increases transmitted power. The power receiving apparatus 101 transmits an RP0 in which "0" is stored in a request bit, to the power transmission apparatus 100 (F621).

If the power transmission apparatus 100 receives the RP0, because "0" is stored in the request bit, the power transmission apparatus 100 does not perform the third foreign object detection processing, and executes the second foreign object detection processing based on the Calibration curve in FIG. 11. If the power transmission apparatus 100 consequently determines that there is a high possibility that no foreign object exists, the power transmission apparatus 100 transmits ACK (F622).

Figure 6A:
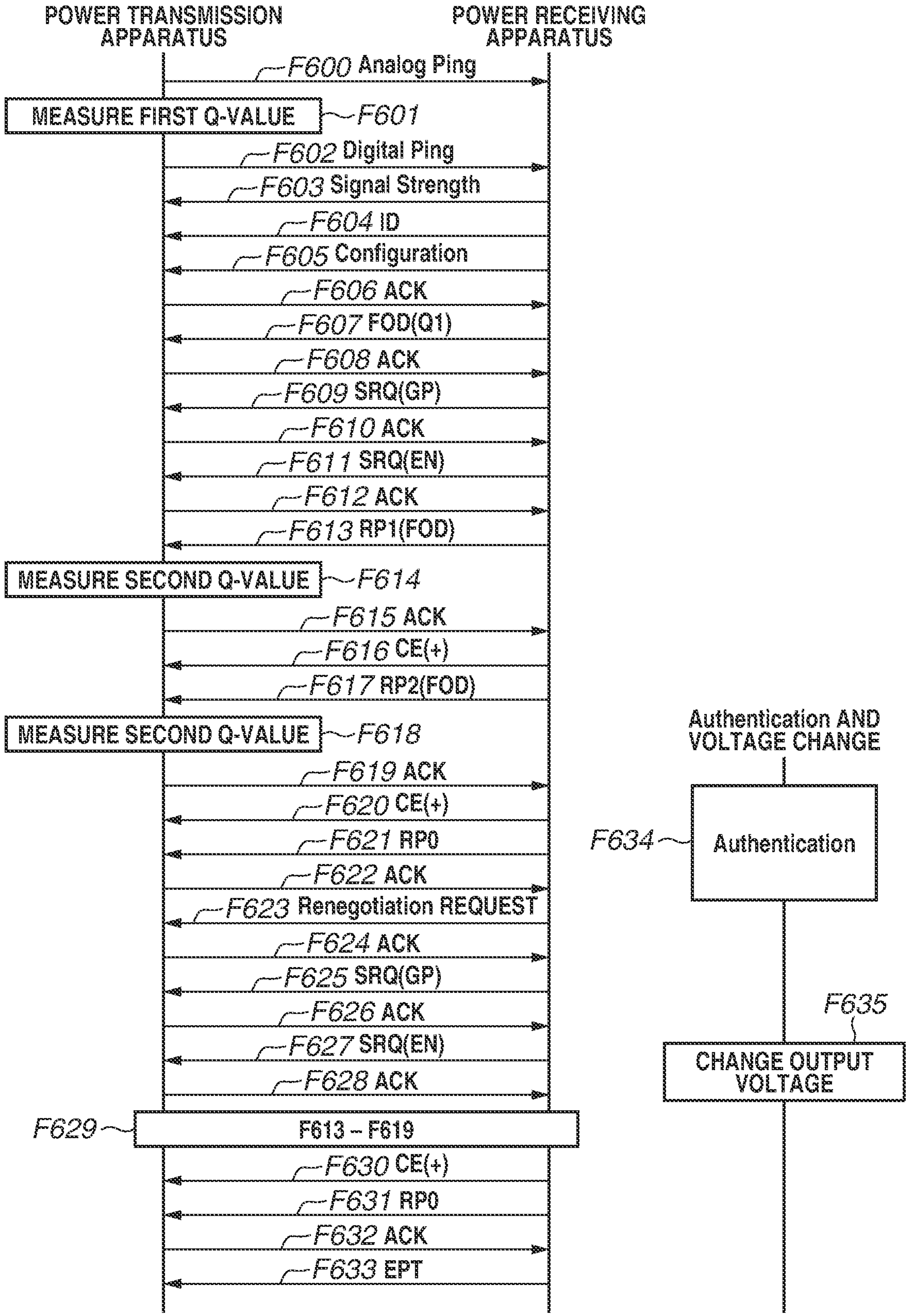
FIG. 6A is a sequence diagram illustrating operations of a power transmission apparatus and a power receiving apparatus.

Here, Authentication processing (F634) to be performed between the power transmission apparatus 100 and the power receiving apparatus 101 will be described. The Authentication processing is processing in which the power receiving apparatus 101 authenticates the validity of the power transmission apparatus 100 using a digital certificate. Further, the Authentication processing is processing in which the power transmission apparatus 100 authenticates the validity of the power receiving apparatus 101 using a digital certificate. The Authentication processing is executed by the Authentication processing units 209 and 308 of the power receiving apparatus 101 and the power transmission apparatus 100 illustrated in FIGS. 2 and 3. Further, the Authentication processing is asynchronously executed between the power receiving apparatus 101 and the power transmission apparatus 100 independently of a flow from F600 to F633. For this reason, as illustrated in FIG. 6A, the Authentication processing (F634) can be described in parallel to a flow from F619 to F622. If the power receiving apparatus 101 confirms that the power transmission apparatus 100 is valid, the power receiving apparatus 101 can request the power transmission apparatus 100 to transmit power larger than predetermined power (for example, GP is 5 watt, F609). Similarly, if the power transmission apparatus 100 confirms that the power receiving apparatus 101 is valid, the power transmission apparatus 100 can accept power larger than predetermined power (for example, GP is 5 watt, F609) as GP for the power receiving apparatus 101. Furthermore, the power receiving apparatus 101 sometimes changes an output voltage of the voltage control unit 203 depending on the magnitude of GP. For example, if GP is 5 watt, an output voltage is 5 volt, but if GP exceeds 5 watt, the power receiving apparatus 101 is considered to change an output voltage to 9 volt. Further, similarly to the Authentication processing, the change of an output voltage is asynchronously executed independently of communication between the power transmission apparatus 100 and the power receiving apparatus 101. That is, the power receiving apparatus 101 changes output power to be output to the load, in accordance with the Authentication processing, and changes an output voltage in accordance with the change.

The description will return to the description of the flow. If the power receiving apparatus 101 confirms that the power transmission apparatus 100 is valid, through the Authentication processing (F634), the power receiving apparatus 101 transmits a request for renegotiation (Renegotiation) to the power transmission apparatus 100 (F623). Then, the power transmission apparatus 100 transmits ACK accepting a renegotiation request, to the power receiving apparatus 101 (F624).

The power receiving apparatus 101 requests 15 watt as Guaranteed Power using an SRQ (GP) (F625), and the power transmission apparatus 100 accepts this (F626). Then, the power receiving apparatus 101 transmits an SRQ (EN) (F627). The power transmission apparatus 100 transmits ACK and ends the renegotiation (F628).

Here, the voltage control unit 203 is assumed to have changed an output voltage (F635). Because loss of the voltage control unit 203 changes if the output voltage is changed, the already-created Calibration curve is to be discarded and a Calibration curve is to be newly created. In the present exemplary embodiment, this processing will be referred to as recalibration processing. The power transmission apparatus 100 and the power receiving apparatus 101 execute recalibration processing based on the already-described flow from F613 to F619 (F629). Here, in FIG. 11, in recalibration processing, a Calibration data Point (point 1104) is created by the RP1 (FOD) and a Calibration data Point (point 1105) is created by the RP2 (FOD). Thereafter, the power transmission apparatus 100 executes the second foreign object detection processing based on the line segment (Calibration curve) connecting the points 1104 and 1105.

If the recalibration processing ends, the power receiving apparatus 101 transmits a CE (+) to the power transmission apparatus 100 (F630), and performs charging with output power being increased to 5 watt or more. Then, the power receiving apparatus 101 transmits an RP0 to the power transmission apparatus 100 (F631). The power transmission apparatus 100 executes the second foreign object detection processing, determines that there is a high possibility that no foreign object exists, and transmits ACK (F632).

If the charging ends, the power receiving apparatus 101 transmits, to the power transmission apparatus 100, an End Power Transfer (EPT) packet requesting the stop of power transmission (F633).

As described above, wireless power transmission is performed between the power transmission apparatus 100 and the power receiving apparatus 101 based on the first foreign object detection processing, the second foreign object detection processing, the third foreign object detection processing, the Authentication processing, and output voltage change.

(Third Foreign Object Detection Processing That Is Based on Plurality of Times of Second Q-Value Measurement)

Figure 6B:
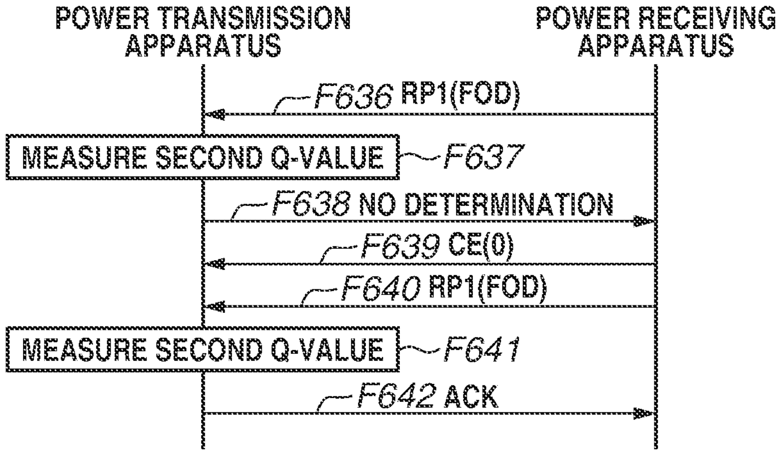
FIG. 6B is a sequence diagram illustrating operations of a power transmission apparatus and a power receiving apparatus.

In the sequence in FIG. 6A, the power transmission apparatus 100 executes the second Q-value measurement once, and performs the third foreign object detection processing based on the result. Here, the power transmission apparatus 100 can sometimes perform the second Q-value measurement a plurality of times, and execute the third foreign object detection processing based on the results. Processing of performing the third foreign object detection based on a plurality of results of the second Q-value measurement will be described with reference to FIG. 6B. In addition, in FIG. 6B, the power transmission apparatus 100 is assumed to execute the second Q-value measurement twice and execute the third foreign object detection processing based on the results.

First of all, the power receiving apparatus 101 transmits an RP1 (FOD) to the power transmission apparatus 100 (F636). If the power transmission apparatus 100 receives the RP1 (FOD), the power transmission apparatus 100 executes the second Q-value measurement (F637). Here, the second Q-value measurement (F637) executed by the power transmission apparatus 100 is the first-time second Q-value measurement out of the second Q-value measurement to be executed twice. Thus, the power transmission apparatus 100 transmits, to the power receiving apparatus 101 as response to the RP1 (FOD) (F636), "no determination" indicating that determination (decision) as to whether to accept Calibration data included in the received RP1 (FOD), as a Calibration data Point is not to be performed (F638).

The power receiving apparatus 101 transmits a CE(0) requesting the power transmission apparatus 100 to maintain a receiving voltage, to the power transmission apparatus 100 (F639). The power receiving apparatus 101 transmits an RP1 (FOD) again to the power transmission apparatus 100 (F640).

If the power transmission apparatus 100 receives the RP1 (FOD), the power transmission apparatus 100 executes the second Q-value measurement (F641).

Here, the second Q-value measurement (F641) executed by the power transmission apparatus 100 is the second-time second Q-value measurement out of the second Q-value measurement to be executed twice. The power transmission apparatus 100 determines that a transmitted power value within the period of $T_{window}$ is stable, and there is a high possibility that a foreign object has not been detected by the third foreign object detection. In this case, the power transmission apparatus 100 makes a determination so as to accept a received power value stored in the RP1 (FOD), and a transmitted power value obtained when the received power is obtained (transmitted power value within the period of $T_{window}$), as a Calibration data Point (corresponding to the point 1100 in FIG. 11), and transmits ACK to the power receiving apparatus 101 (F642).

Here, an example of a method by which the power transmission apparatus 100 determines the existence or non-existence of a foreign object based on results of the second Q-value measurement executed a plurality of times will be described. In a case where the power transmission apparatus 100 executes the second Q-value measurement twice, in a case where a second Q-value obtained by the first-time measurement is lower than a predetermined threshold value, the power transmission apparatus 100 first determines that there is a high possibility that a foreign object exists. Further, in a case where the obtained second Q-value is higher than the predetermined threshold value, the power transmission apparatus 100 determines that there is a low possibility that a foreign object exists (there is a high possibility that no foreign object exists). The power transmission apparatus 100 stores the first-time determination result, and transmits a notification indicating "no determination", to the power receiving apparatus 101. Subsequently, the power transmission apparatus 100 similarly performs the determination on a second Q-value obtained by the second-time measurement. Here, in a case where both of the first-time and second-time determination results indicate that "there is a low possibility that a foreign object exists (there is a high possibility that no foreign object exists)", the power transmission apparatus 100 transmits ACK to the power receiving apparatus 101. Further, in a case where at least one of the first-time and second-time determination results indicates that "there is a high possibility that a foreign object exists", the power transmission apparatus 100 transmits NAK to the power receiving apparatus 101.

In addition, a determination method that is based on a plurality of second Q-values is not limited to the above-described method. For example, the power transmission apparatus 100 may be configured to transmit ACK to the power receiving apparatus 101 in a case where at least one of the first-time and second-time determination results indicates that "there is a low possibility that a foreign object exists (there is a high possibility that no foreign object exists)". Alternatively, for example, the power transmission apparatus 100 may be configured to transmit ACK to the power receiving apparatus 101 in a case where at least the second-time determination result indicates that "there is a low possibility that a foreign object exists (there is a high possibility that no foreign object exists)".

Issue of Present Exemplary Embodiment

An issue of the present exemplary embodiment will be described with reference to FIGS. 6C and 11. As already described with reference to FIGS. 6A and 11, in a case where the change of an output voltage is performed before an RP1 (FOD) is transmitted, a straight line connecting the points 1104 and 1105, which is correct Calibration data, is obtained by recalibration.

Figure 6C:
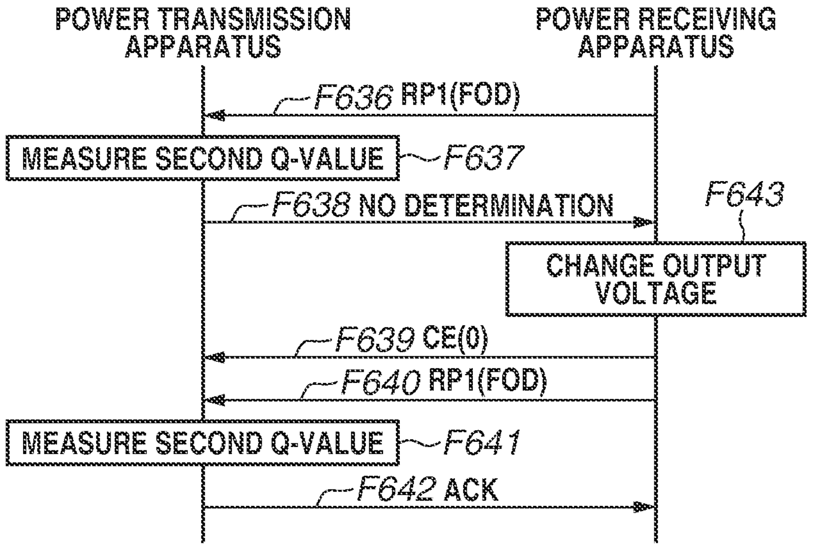
FIG. 6C is a sequence diagram illustrating operations of a power transmission apparatus and a power receiving apparatus.

In FIG. 6C, the power receiving apparatus 101 transmits an RP1 (FOD) (F636), and after the power transmission apparatus 100 executes the second Q-value measurement (F637), the power receiving apparatus 101 transmits "no determination" (F638). Here, it is assumed that, in accordance with the concurrently-performed Authentication processing, an output voltage of the voltage control unit 203 of the power receiving apparatus 101 has been changed (F643).

As already described, the power receiving apparatus 101 is to execute recalibration. Nevertheless, because the power transmission apparatus 100 and the power receiving apparatus 101 are performing the third foreign object detection processing that is based on a plurality of times of second Q-value measurement, recalibration cannot be performed. This is because, even if the power receiving apparatus 101 transmits a first-time RP1 (FOD) in F640 for recalibration, since the power transmission apparatus 100 cannot distinguish the first-time RP1 (FOD) from a second-time RP1 (FOD), the power transmission apparatus 100 transmits ACK in F642.

Thus, the power transmission apparatus 100 creates a Calibration data Point using received power values stored in the RP1 (FOD) transmitted in F636 and F640, and transmitted power values of the power transmission apparatus 100 that are obtained when the received power is obtained (transmitted power value within the period of $T_{window}$). Here, because an output voltage has been changed, consumed power of the voltage control unit 203 changes between F636 and F640, and transmitted power accordingly changes as well. Thus, a Calibration data Point in FIG. 11 becomes a point 1106 different from the point 1104. Accordingly, the power transmission apparatus 100 performs the second foreign object detection processing based on a line segment connecting the points 1106 and 1105 that is different from the line segment connecting the points 1104 and 1105. This line segment might fail to correctly indicate a relationship between transmitted power and received power that is obtainable in a case where no foreign object exists. This consequently produces an issue that the accuracy of foreign object detection deteriorates and false detection of a foreign object can occur. In addition, the false detection of a foreign object refers to determining that "no foreign object exists" in a case where a foreign object exists, or determining that "a foreign object exists" in a case where no foreign object exists.

(Control for Preventing Accuracy Deterioration of Foreign Object Detection)

In a case where it is determined that an inaccurate Calibration data Point (point 1106) has been created, the power receiving apparatus 101 of the present exemplary embodiment promptly performs recalibration processing. Operations of the power receiving apparatus 101 and the power transmission apparatus 100 of the present exemplary embodiment will be described with reference to FIG. 7A.

Figure 7A:
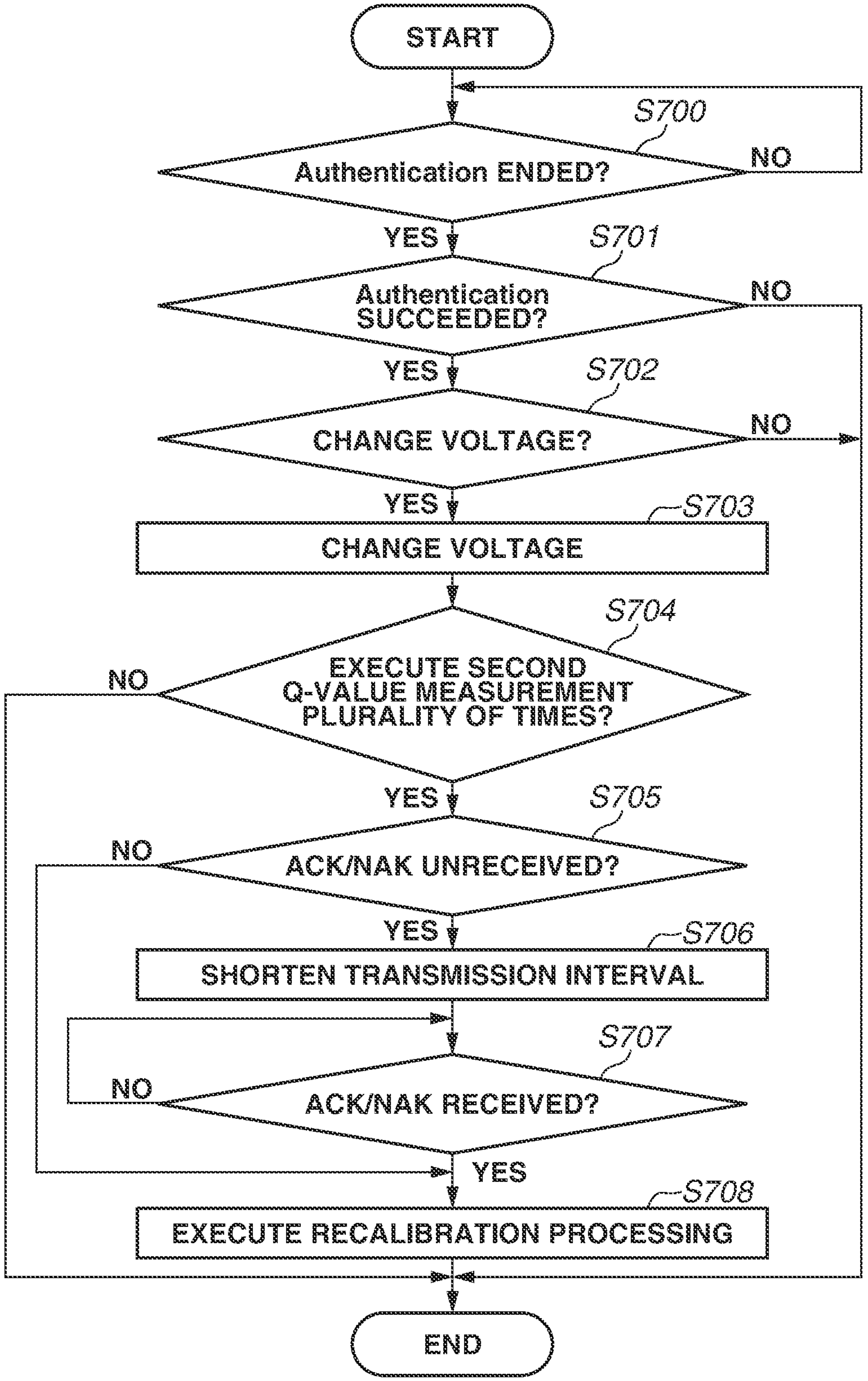
FIG. 7A is a flowchart illustrating processing of a power receiving apparatus.

In FIG. 7A, if the Authentication processing ends (YES in step S700), and the Authentication succeeds (YES in step S701), the power receiving apparatus 101 recognizes that the power transmission apparatus 100 is valid. Then, in step S702, when performing renegotiation to change GP from 5 watt to 15 watt, for example, the power receiving apparatus 101 checks whether to change an output voltage of the voltage control unit 203. Here, the power receiving apparatus 101 make a determination so as to change an output voltage from 5 volt to 9 volt (YES in step S702).

After changing the output voltage, the power receiving apparatus 101 determines whether to perform the third foreign object detection processing based on a plurality of times of the second Q-value measurement. Because the power receiving apparatus 101 performs the third foreign object detection processing based on the second-time second Q-value measurement (YES in step S704), the power receiving apparatus 101 determines whether the Calibration processing is currently being executed in step S705. Here, a state in which the Calibration processing is currently being executed means that, although an RP1 (FOD) or an RP2 (FOD) is transmitted, ACK or NAK being a response thereto has not been received from the power transmission apparatus 100. As described with reference to FIG. 6C, in a case where a voltage is changed during the Calibration processing, there is a possibility that an inaccurate Calibration data Point is created. Thus, the power receiving apparatus 101 early executes recalibration processing by following processing.

The power receiving apparatus 101 transmits packets of an RP1 (FOD), an RP2 (FOD), and a CE at predetermined intervals. In addition, the predetermined intervals need not be a completely-identical interval, and may be substantially-equal intervals. In a case where it is determined that the third foreign object detection processing is to be performed based on a plurality of times of the second Q-value measurement (YES in step S704), in step S706, the power receiving apparatus 101 shortens a transmission interval of the RP1 (FOD), the RP2 (FOD), and the CE to be transmitted at the predetermined intervals, until the recalibration processing ends. Specifically, for example, the power receiving apparatus 101 shortens Treceived being a transmission interval of the RP1 (FOD) and the RP2 (FOD) that is defined in the WPC standard, to 100 milliseconds from 500 milliseconds set so far. Then, the power receiving apparatus 101 shortens Tinterval being a transmission interval of the CE that is defined in the WPC standard, to 50 milliseconds from 250 milliseconds, for example.

The power receiving apparatus 101 can thereby receive ACK and NAK from the power transmission apparatus 100 (YES in step S707), and shorten a time until a Calibration data Point (point 1106) is created (Calibration processing is ended). Then, in step S708, the power receiving apparatus 101 executes recalibration processing.

Further, in a case where the Authentication processing has not succeeded (it cannot be confirmed that the power transmission apparatus 100 is valid) (NO in step S701), or in a case where the change of an output voltage is not to be performed (NO in step S702), the power receiving apparatus 101 ends the processing. Also in a case where the second Q-value measurement is not to be executed a plurality of times (NO in step S704), the power receiving apparatus 101 similarly ends the processing.

Further, in a case where ACK or NAK has already been received at the time point at which an output voltage has been changed, and a Calibration data Point has been created (NO in step S705), recalibration processing is performed.

(Flow of Operations of Power Transmission Apparatus 100 and Power Receiving Apparatus 101 of Present Exemplary Embodiment)

Figure 6D:
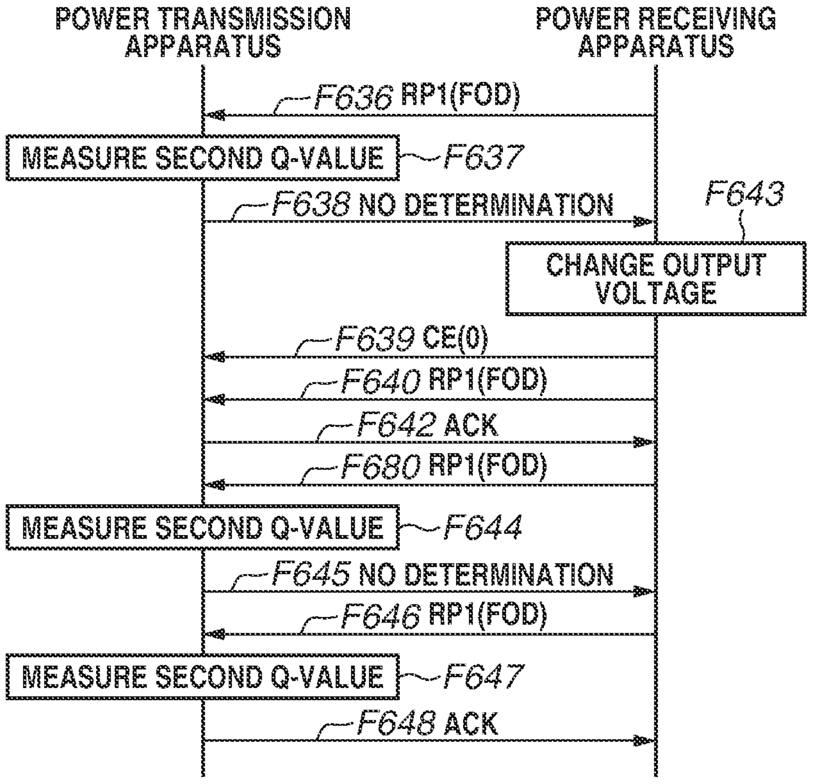
FIG. 6D is a sequence diagram illustrating operations of a power transmission apparatus and a power receiving apparatus.

A flow of operations of the power transmission apparatus 100 and the power receiving apparatus 101 of the present exemplary embodiment will be described with reference to FIG. 6D. The power receiving apparatus 101 transmits an RP1 (FOD) (F636). If the power transmission apparatus 100 receives the RP1 (FOD), the power transmission apparatus 100 executes the second Q-value measurement (F637), and transmits "no determination" to the power receiving apparatus 101 as a response (F638).

Then, the power receiving apparatus 101 changes an output voltage of the voltage control unit 203 (F643). At this time, the power receiving apparatus 101 makes a transmission interval of a CE(0) (F639) and a following RP1 (FOD) to an interval shorter than the predetermined interval. The power receiving apparatus 101 transmits a CE(0) (or CE (+), or CE(−)) and an RP1 (FOD) to the power transmission apparatus 100 (F639, F640), and receives ACK from the power transmission apparatus 100 (F642). An inaccurate Calibration data Point (point 1106) is created at this time point. The power receiving apparatus 101 transmits an RP1 (FOD) (F680), and starts recalibration processing.

If the power transmission apparatus 100 receives the RP1 (FOD), the power transmission apparatus 100 executes the second Q-value measurement (S644), and transmits "no determination" to the power receiving apparatus 101 as a response (F645). Subsequently, the power receiving apparatus 101 transmits an RP1 (FOD) to the power transmission apparatus 100 (F646). Based on the third foreign object detection processing that is based on the second Q-value measurement executed twice in F644 and F647, the power transmission apparatus 100 transmits ACK (F648). In addition, a transmission interval of a packet transmitted during the recalibration processing is also set to an interval shorter than the predetermined interval, but the transmission interval is not limited to this. The packet may be transmitted at the not-shortened predetermined interval.

In a case where it is determined that an inaccurate Calibration data Point (point 1106) has been created through the above-described operations, the power receiving apparatus 101 can promptly perform recalibration processing. A Calibration curve created in the recalibration processing becomes the line segment connecting the points 1104 and 1105 in FIG. 11.

In addition, an example in which an output voltage is changed after F638 has been described with reference to FIG. 6D, but output voltage change may occur at an arbitrary timing. Specifically, output voltage change may occur between the RP1 (FOD) (F636) and "no determination" (F638), or may occur between F640 and F641.

In addition, for example, by an output voltage being changed before the power transmission apparatus 100 restricts power transmission for a predetermined period to perform the measurement of the second Q-value, an attenuation waveform of a voltage and a current of the power transmission coil 303 might vary from that in a case where an output voltage is changed. Accordingly, false detection can be performed to indicate that "a foreign object exists", although a result of the third foreign object detection processing is to originally indicate that no foreign object exists. In this case, the power transmission apparatus 100 transmits NAK to the power receiving apparatus 101 as a response to the RP1. Also in this case, the power receiving apparatus 101 transmits an RP1 again for recalibration. Accordingly, an operation is performed in such a manner that, in a case where the change of an output voltage is performed after an RP1 and an RP2 are transmitted, even in a case where either of ACK and NAK is transmitted from the power transmission apparatus 100, the power receiving apparatus 101 transmits an RP1 and an RP2 again.

Further, in a case where a foreign object actually exists, the power transmission apparatus 100 determines that "a foreign object exists", and transmits NAK to the power receiving apparatus 101 as a response to the RP1. In this case, if the power receiving apparatus 101 receives NAK even if a voltage change has not been performed, the power receiving apparatus 101 may transmit an RP1 again for recalibration. With this configuration, it is possible to prevent power transmission from being immediately stopped, and cause the power transmission apparatus 100 to perform foreign object detection processing again. This can reduce the possibility of false detection.

Second Exemplary Embodiment

In a case where the change of an output voltage occurs during the Calibration processing, the power receiving apparatus 101 of the first exemplary embodiment shortens a transmission interval of a CE and a Received Power Packet to promptly execute recalibration processing. In the present exemplary embodiment, another configuration of promptly executing recalibration processing will be described. In addition, configurations of the power transmission apparatus 100 and the power receiving apparatus 101 in the present exemplary embodiment are assumed to be similar to those in the first exemplary embodiment, and the description will be omitted.

(Operation Description of Power Receiving Apparatus and Power Transmission Apparatus of Present Exemplary Embodiment)

Figure 7B:
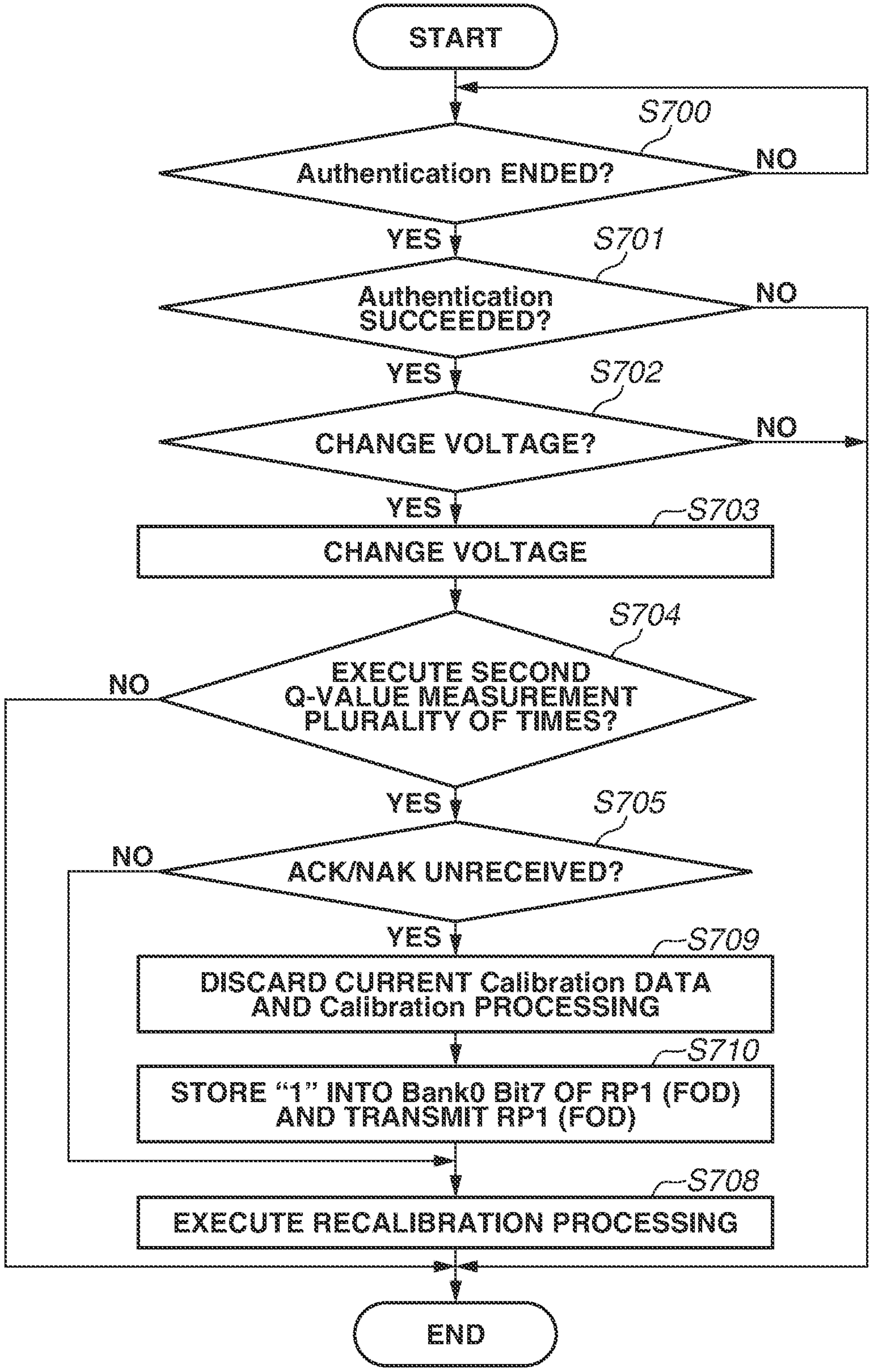
FIG. 7B is a flowchart illustrating processing of a power receiving apparatus.

An operation of the power receiving apparatus 101 in the present exemplary embodiment will be described with reference to FIG. 7B. In addition, the processes similar to the processes in FIG. 7A are assigned the same step numbers, and the description will be omitted.

In a case where an output voltage is changed during the Calibration processing and ACK or NAK has not been received from the power transmission apparatus (NO in step S705), in step S709, the power receiving apparatus 101 make a determination so as to discard Calibration data owned by the power transmission apparatus 100. Here, the Calibration data to be discarded refers to a received power value stored in an RP1 (FOD) transmitted before the output voltage is changed, and a transmitted power value corresponding to the received power value.

The power receiving apparatus 101 transmits, to the power transmission apparatus 100, a Received Packet storing an information element for causing the power transmission apparatus 100 to discard Calibration data and Calibration processing. FIG. 9 illustrates a frame format of a Received Power Packet defined in the WPC standard. According to FIG. 9, a Received Power Value being a received power value is stored for bit0 (b0) to bit7 (b7) of Bank1 and Bank2. Further, bit0 (b0) to bit2 (b2) of Bank0 correspond to a Mode field. In the Mode field, information indicating that a Received Power Packet is any of mode0, mode1, and mode2 described above is stored. Then, bit3 (b3) to bit7 (b7) of Bank0 correspond to a reserved domain (Reserved). In the present exemplary embodiment, an information element for discarding Calibration data is allocated to bit7 of Bank0 in the reserved domain. Specifically, in step S710, the power receiving apparatus 101 stores "1" in Bank0 Bit7 of the RP1 (FOD), and transmits the RP1 (FOD) to the power transmission apparatus 100. Further, the RP1 (FOD) in which "1" is stored in Bank0 Bit7 means that Calibration data is to be discarded and recalibration processing is to be started. Then, the power receiving apparatus 101 and the power transmission apparatus 100 execute recalibration processing (S708).

Figure 8:
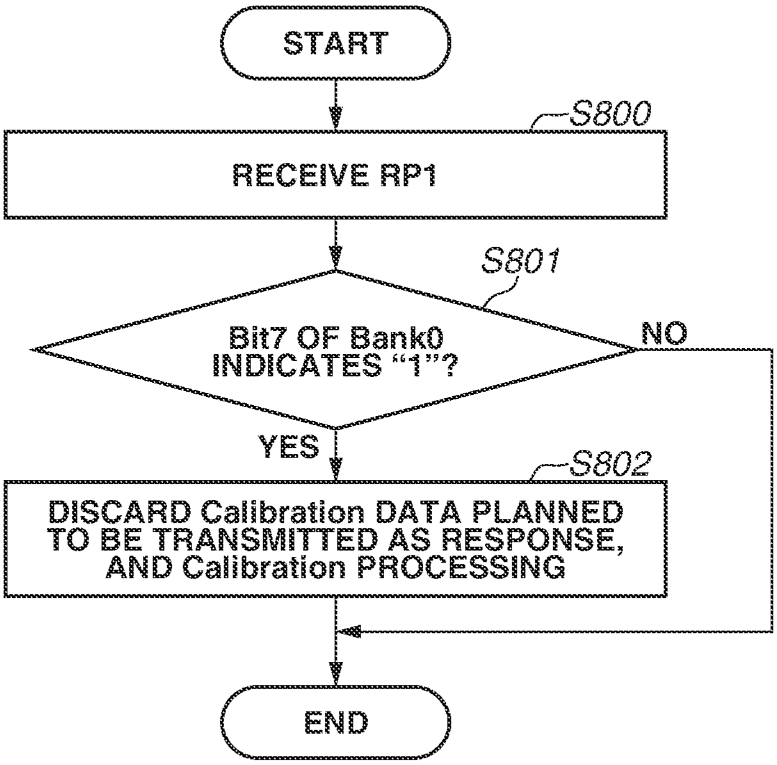
FIG. 8 is a flowchart illustrating processing of a power transmission apparatus.

FIG. 8 illustrates a flow of the power transmission apparatus 100 of the present exemplary embodiment. If the power transmission apparatus 100 receives an RP1 in step S800, the power transmission apparatus 100 determines whether bit7 of Bank0 indicates "1" in step S801. If bit7 of Bank0 indicates "1", in step S802, the power transmission apparatus 100 discards Calibration data planned to be transmitted as a response, and stops the Calibration processing. Here, discarding Calibration data includes discarding a value of a second Q-value measured for a response, and a received power value stored in an RP1. Then, stopping the Calibration processing means interrupting processing of executing the second Q-value measurement in response to the RP1 (FOD), and transmitting a response indicating "no determination" in accordance with the number of times an RP1 (FOD), or an ACK response, or an NAK response. If the power transmission apparatus 100 receives an RP1 (FOD) in which Bit7 of Bank0 indicates "1", the power transmission apparatus 100 stores a received power value stored in the packet, and a result of the following second Q-value measurement, and uses these in recalibration processing.

Through the above-described processing, in a case where an output voltage is changed during the Calibration processing, it is possible to promptly execute recalibration processing without creating an inaccurate Calibration data Point (point 1106).

In addition, the power receiving apparatus 101 may be configured to transmit an RP1 or an RP2 including information for discarding Calibration data, at an interval shorter than the predetermined interval as described in the first exemplary embodiment.

(Flow of Operations of Power Transmission Apparatus 100 and Power Receiving Apparatus 101 of Present Exemplary Embodiment)

Figure 6E:
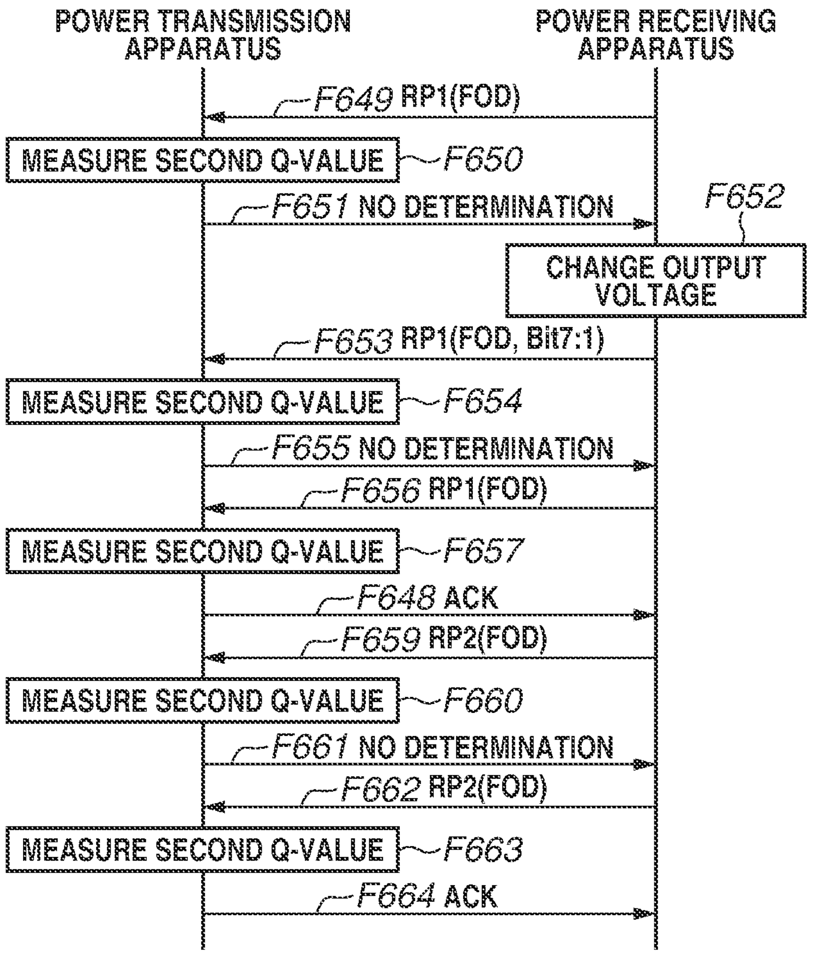
FIG. 6E is a sequence diagram illustrating operations of a power transmission apparatus and a power receiving apparatus.

A flow of operations of the power transmission apparatus 100 and the power receiving apparatus 101 of the present exemplary embodiment will be described with reference to FIG. 6E. The power receiving apparatus 101 transmits an RP1 (FOD) (F649). If the power transmission apparatus 100 receives the RP1 (FOD), the power transmission apparatus 100 executes the second Q-value measurement (S650), and transmits "no determination" to the power receiving apparatus 101 as a response (F651).

Then, the power receiving apparatus 101 changes an output voltage of the voltage control unit 203 (F652). If the output voltage is changed, the power receiving apparatus 101 transmits a RP1 in which bit7 of Bank0 indicates "1" (F653). In FIG. 6E, an RP1 in which bit7 of Bank0 indicates "1" is represented as an RP1 (FOD, Bit7:1). If the power transmission apparatus 100 receives the RP1 (FOD, Bit7:1), the power transmission apparatus 100 discards a received power value received in F649 and a second Q-value measured in F650. Further, the power transmission apparatus 100 starts new Calibration processing that uses the RP1 (FOD, Bit7:1) and a second Q-value measured in the second Q-value measurement (F654).

Originally, Q-value measurement (F654) performed in response to the RP1 (FOD, Bit7:1) received in F653 is second-time measurement. Nevertheless, by the RP1 (FOD, Bit7:1), a result of first-time Q-value measurement and Calibration data are discarded. That is, the power transmission apparatus 100 determines that the RP1 (FOD, Bit7:1) in F653 and the second Q-value measurement (F654) correspond to first-time measurement out of measurement to be executed twice, and transmits "no determination" to the power receiving apparatus 101 as a response (F655).

Subsequently, the power receiving apparatus 101 transmits a second-time RP1 (FOD) to the power transmission apparatus 100 (F656).

Based on the third foreign object detection processing that is based on the second Q-value measurement executed twice in F654 and F657, the power transmission apparatus 100 transmits ACK (F648).

Subsequently, the power transmission apparatus 100 and the power receiving apparatus 101 performs operations from F659 to F644 based on the already-described sequence, and creates a Calibration curve. In addition, a Calibration curve created in the recalibration processing becomes the line segment connecting the points 1104 and 1105 in FIG. 11.

As described above, the power transmission apparatus 100 and the power receiving apparatus 101 determine that the change of an output voltage occurs during the Calibration processing, and an inaccurate Calibration data Point (point 1106) can be created. Then, it is possible to execute recalibration processing without creating an inaccurate Calibration data Point (point 1106).

Third Exemplary Embodiment

In the first exemplary embodiment and the second exemplary embodiment, the power receiving apparatus 101 promptly executes recalibration processing in a case where the change of an output voltage occurs during the Calibration processing. In the present exemplary embodiment, the power receiving apparatus 101 operates in such a manner as not to perform a voltage change during the Calibration processing. In addition, configurations of the power transmission apparatus 100 and the power receiving apparatus 101 in the present exemplary embodiment are assumed to be similar to those in the first and second exemplary embodiments, and the description will be omitted.

(Operation Description of Power Receiving Apparatus and Power Transmission Apparatus of Present Exemplary Embodiment)

Figure 7C:
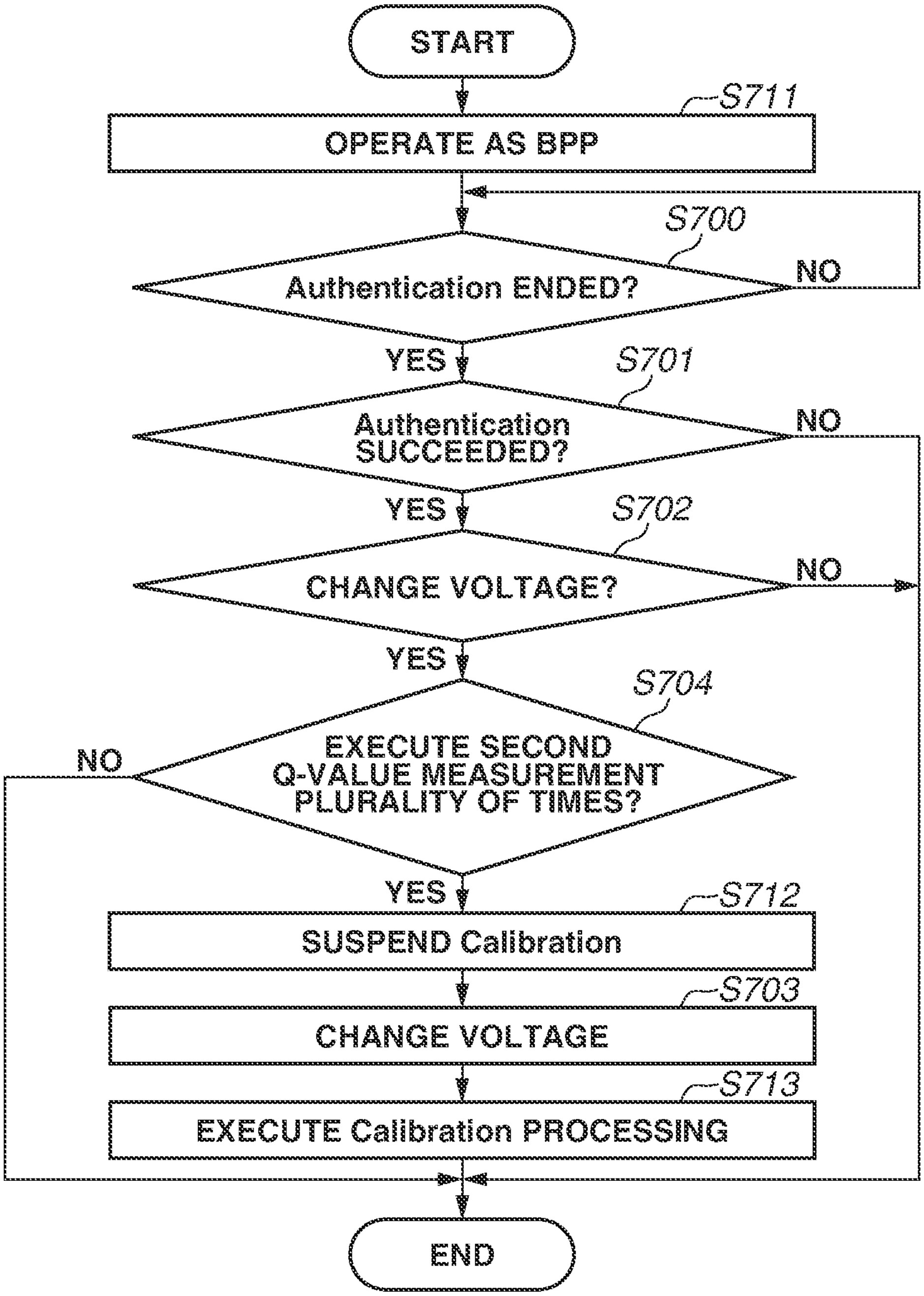
FIG. 7C is a flowchart illustrating processing of a power receiving apparatus.

An operation of the power receiving apparatus 101 will be described with reference to a flow of the power receiving apparatus 101 of the present exemplary embodiment in FIG. 7C. In addition, the processes similar to the processes in FIGS. 7A and 7B are assigned the same step numbers, and the description will be omitted.

After the power receiving apparatus 101 receives Digital Ping, in step S711, the power receiving apparatus 101 operates as a power receiving apparatus with a Basic Power Profile (BPP) defined in the WPC standard, and starts charging. In the power receiving apparatus with the BPP, GP is restricted to 5 watt because the above-described Negotiation processing and Calibration processing are not performed.

In a case where Authentication processing ends (YES in step S700), Authentication succeeds (YES in step S701), and it is determined that a voltage change is to be performed (YES in step S702), the power receiving apparatus 101 determines whether to perform the third foreign object detection processing based on a plurality of times of the second Q-value measurement. Then, in a case where the third foreign object detection processing is to be performed based on a plurality of times of the second Q-value measurement (YES in step S704), in step S712, the power receiving apparatus 101 suspends Calibration processing.

After that, in step S703, the power receiving apparatus 101 changes an output voltage, and then in step S713, the power receiving apparatus 101 executes Calibration processing. Through the above-described processing, because a voltage change is not performed during the Calibration processing, it is possible to prevent inaccurate Calibration data from being obtained.

(Flow of Operations of Power Transmission Apparatus 100 and Power Receiving Apparatus 101 of Present Exemplary Embodiment)

Figure 6F:
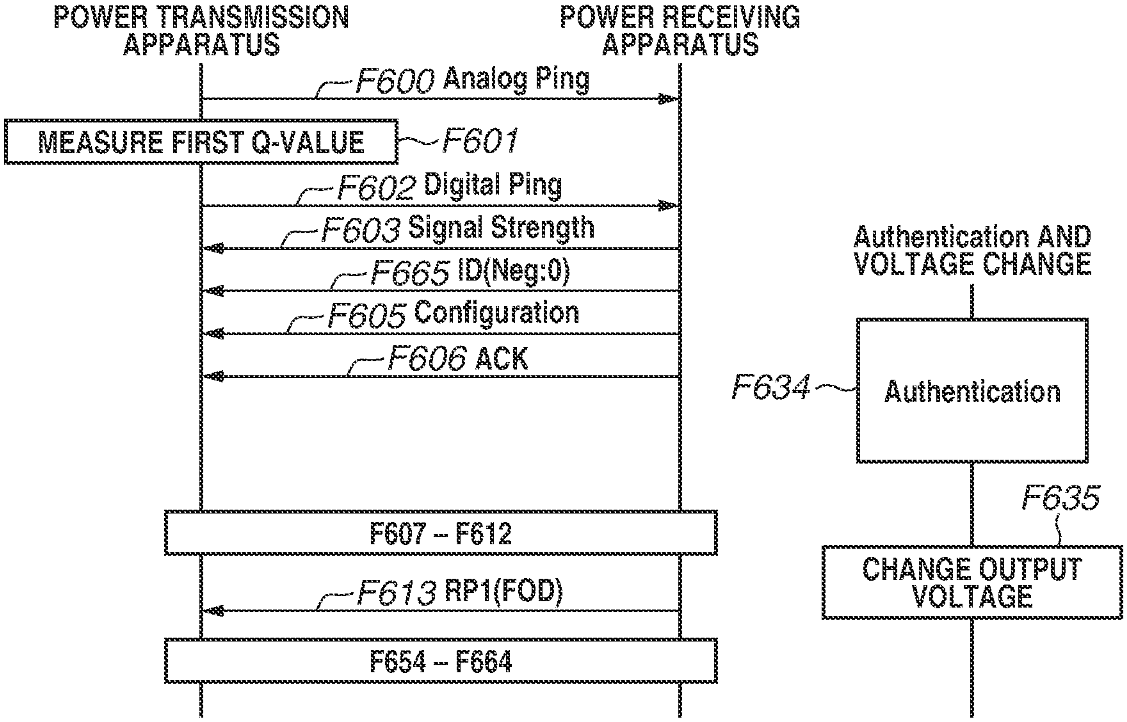
FIG. 6F is a sequence diagram illustrating operations of a power transmission apparatus and a power receiving apparatus.

A flow of operations of the power transmission apparatus 100 and the power receiving apparatus 101 of the present exemplary embodiment will be described with reference to FIG. 6F.

When transmitting an ID packet, the power receiving apparatus 101 notifies the power transmission apparatus 100 that the power receiving apparatus 101 operates as BPP. Specifically, the power receiving apparatus 101 stores "0" into a Neg bit indicating that Negotiation processing is supported, among information elements of the ID packet, and notifies the power transmission apparatus of this (S665). After that, GP is set to 5 watt and charging is started.

If Authentication processing executed by the Authentication processing unit 209 of the power receiving apparatus 101 ends (F634), GP is set to 15 watt based on the processing from F607 to F612, and an output voltage is changed (F635). Then, if the change of the output voltage ends, the power receiving apparatus 101 executes Calibration processing based on the processing described in F613 and F654 to F664.

Through the processing described above, the power transmission apparatus 100 and the power receiving apparatus 101 can prevent an inaccurate Calibration data Point (point 1106) from being acquired.

Other Exemplary Embodiments

The configurations of the power transmission apparatus 100 and the power receiving apparatus 101 are not limited to the configurations described in the first to third exemplary embodiments, and may include a part or a plurality of configurations to be described below.

A configuration in which the power receiving apparatus 101 changes an output voltage after receiving "no determination" (F651) has been described with reference to FIGS. 6D and 6E. Nevertheless, a timing of changing an output voltage is not limited to this, and the change of an output voltage may be executed at an arbitrary timing. Specifically, the change of an output voltage may be executed between an RP1 (FOD) (F636) and "no determination" (F638), or may be executed between F640 and F641. Further, an example in which an output voltage is changed when a Calibration data Point of an RP1 (FOD) is created has been described, but the change of an output voltage may be executed when a Calibration data Point of an RP2 (FOD) is created. Furthermore, the change of an output voltage need not be executed during the Calibration processing. Specifically, it is obvious that a similar effect can be obtained even in a case where an output voltage is changed during the execution of an RP0 (FOD).

Further, in the present exemplary embodiment, the description has been given assuming that the power receiving apparatus 101 changes an output voltage, but a configuration is not limited to the configuration. For example, the voltage control unit 203 may be controlled by a different control unit (not illustrated) (for example, a different control unit of a product in which the power receiving apparatus 101 is mounted). In this case, by communication between the different control unit and the control unit 200, the power receiving apparatus 101 may detect a change in output voltage. In this case, the different control unit may notify the control unit 200 of a change in output voltage. The notification can be implemented by communication executed via a General-purpose input/output (GPIO) or an Inter-Integrated Circuit ($I^2C$).

Further, a configuration of the change of an output voltage may be a configuration in which the control unit 200 constantly measures an output voltage of the voltage control unit 203 and detects a change. Further, the power transmission apparatus 100 and the power receiving apparatus 101 measure a Q-value in the second Q-value measurement processing, but the measurement may have a configuration of measuring a coupling coefficient k. The third foreign object detection processing may be foreign object detection processing that is based on the coupling coefficient k.

Further, in the above-described exemplary embodiments, the description has been given of a case where the third foreign object detection processing is performed based on a plurality of times of the second Q-value measurement. Nevertheless, the above-described exemplary embodiment can also be applied to a case where the third foreign object detection processing is performed based on the second Q-value measurement executed once. For example, in a case where the third foreign object detection processing is performed based on the second Q-value measurement executed once, the power transmission apparatus 100 receives an RP1 or an RP2 from the power receiving apparatus 101, performs the second Q-value measurement, and transmits a response of ACK or NAK. At this time, a voltage change might be performed until a response is transmitted since an RP1 or an RP2 is received. Also in such a case, it is possible to perform recalibration by applying the first exemplary embodiment, or to discard Calibration data by applying the second exemplary embodiment. Alternatively, it is possible to perform control in such a manner that Calibration processing is performed after a voltage change is performed, by applying the third exemplary embodiment.

Furthermore, in the above-described exemplary embodiments, the case where the second Q-value measurement and the third foreign object detection processing are performed has been described, but the configuration is not limited to this. That is, it is possible to apply the above-described exemplary embodiments to a case where the power transmission apparatus 100 does not perform the second Q-value measurement and the third foreign object detection processing. For example, if the power transmission apparatus 100 receives an RP1 or an RP2, the power transmission apparatus 100 transmits a response of ACK or NAK based on whether transmitted power value is stable, or the like. At this time, a voltage change might be performed until a response is transmitted since an RP1 or an RP2 is received. Also in such a case, it is possible to perform recalibration by applying the first exemplary embodiment, or to discard Calibration data by applying the second exemplary embodiment. Alternatively, it is possible to perform control in such a manner that Calibration processing is performed after a voltage change is performed, by applying the third exemplary embodiment.

Further, in the second exemplary embodiment, the description has been given of an example in which the power receiving apparatus 101 allocates an information element for discarding Calibration data and Calibration processing, to bit7 of Bank0 corresponding to a reserved domain in a Received Power Packet. Nevertheless, the configuration is not limited to this, and the information element may be allocated to another bit. Specifically, the information element may be allocated to bit6, Bit5, bit4, or bit3 of Bank0. Alternatively, the information element may be allocated to bit2 in the Mode field.

Further, the information element may be notified using a packet other than a Received Power Packet. For example, among Specific Requests defined in the WPC standard, a Reserved Packet or a Proprietary Packet of which the Packet type is undefined may be used. Further, among General Requests defined in the WPC standard, a Reserved Packet or a Proprietary Packet of which the Packet type is undefined may be used. Further, among packets defined in the WPC standard, a packet other than Specific Requests and General Requests may be used. For example, a Reserved Packet or a Proprietary Packet of which the Packet type is undefined, of a packet other than Specific Requests and General Requests can be used.

Further, in the above-described exemplary embodiments, the description has been given of a case where the second Q-value measurement, and the third foreign object detection processing that is based on a second Q-value are performed by the power transmission apparatus 100. Nevertheless, the configuration is not limited to this. That is, a configuration in which at least either of the second Q-value measurement and the third foreign object detection processing that is based on a second Q-value is performed on the power receiving apparatus 101 side may be employed.

Figure 5:
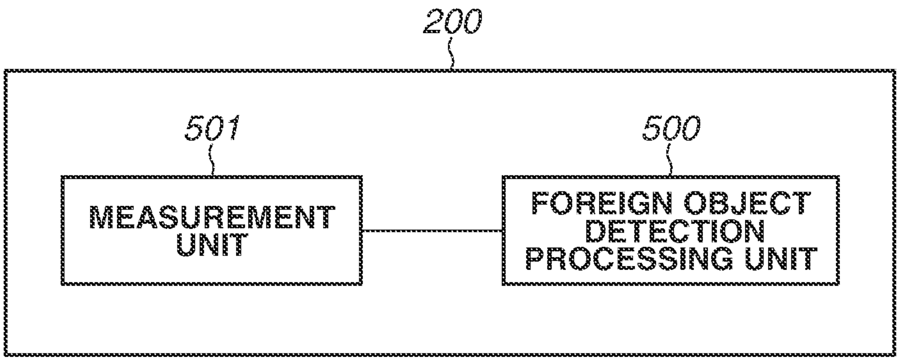
FIG. 5 is a diagram illustrating a function of a control unit of a power receiving apparatus.

An example of the configuration of the power receiving apparatus 101 in a case where the second Q-value measurement and the third foreign object detection processing that is based on a second Q-value are performed by the power receiving apparatus 101 will be described. FIG. 5 illustrates a functional configuration example implemented by the control unit 200 of the power receiving apparatus 101. The control unit 200 in the present exemplary embodiment can operate as each functional unit of a measurement unit 501 and a foreign object detection processing unit 500.

The measurement unit 501 performs the measurement of a Q-value in a time domain (second Q-value measurement). The foreign object detection processing unit 500 executes foreign object detection processing (third foreign object detection processing) that is based on a second Q-value measured by the measurement unit 501. The processing units illustrated in FIG. 5 are formed as respective independent programs, and by event processing or the like, can concurrently operate while taking synchronization between the programs.

A case where the power receiving apparatus 101 performs the third foreign object detection processing will be described with reference to FIG. 6A. For example, the power receiving apparatus 101 preliminarily shares, with the power transmission apparatus 100, a period during which the power transmission apparatus 100 restricts power transmission to measure a second Q-value. The measurement unit 501 measures a second Q-value using the above-described method in a predetermined period during which the power transmission apparatus 100 restricts power transmission. That is, in F614 and F618, the second Q-value measurement is performed by the power receiving apparatus 101 in place of the power transmission apparatus 100. The foreign object detection processing unit 500 performs the third foreign object detection processing based on the acquired second Q-value, and notifies the power transmission apparatus 100 of a determination result indicating the existence or non-existence of a foreign object, using a predetermined packet (not illustrated). The power transmission apparatus 100 transmits ACK or NAK to the power receiving apparatus 101 in accordance with a determination result from the power receiving apparatus 101 (F615, F619). With this configuration, even in a case where the power transmission apparatus 100 does not have a function of the third foreign object detection processing, the third foreign object detection processing can be performed by the power receiving apparatus 101. In addition, in a case where the power receiving apparatus 101 includes only the measurement unit 501, the power receiving apparatus 101 notifies the power transmission apparatus 100 of a second Q-value measured by the measurement unit 501, using a predetermined packet (not illustrated). The power transmission apparatus 100 performs the third foreign object detection processing based on a second Q-value transmitted from the power receiving apparatus 101, and performs the determination of the existence or non-existence of a foreign object. The power transmission apparatus 100 transmits ACK or NAK to the power receiving apparatus 101 in accordance with a determination result (F615, F619).

The present disclosure can also be implemented by processing of supplying a program for implementing one or more functions of the above-described exemplary embodiments, to a system or an apparatus via a network or a storage medium, and one or more processors in a computer of the system or the apparatus reading out and executing the program. Further, the present disclosure can also be implemented by a circuit (for example, an application specific integrated circuit (ASIC)) implementing one or more functions. Further, at least part of the processing illustrated in a flowchart in each drawing may be implemented by hardware. In a case where at least part of the processing is implemented by hardware, for example, it is sufficient that a dedicated circuit is automatically generated on a Field Programmable Gate Array (FPGA) from a program for implementing each step, by using a predetermined compiler. Further, a Gate Array circuit may be formed similarly to the FPGA, and implemented as hardware.

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to perform control for preventing accuracy deterioration attributed to a change in an output voltage to a load of a power receiving apparatus, in processing of detecting an object different from the power receiving apparatus based on power loss.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power receiving apparatus comprising:

a power receiving unit configured to wirelessly receive power from a power transmission apparatus that performs first detection processing of detecting a foreign object based on values of voltages or currents at at least two time points in a predetermined period during which power transmission is restricted;

a transmission unit configured to transmit, to the power transmission apparatus, data indicating received power of the power receiving apparatus that is to be used in second detection processing in which the power transmission apparatus detects a foreign object based on power loss that is based on transmitted power of the power transmission apparatus and received power of the power receiving apparatus, in accordance with a result of the first detection processing;

a change unit configured to change an output voltage to be output to a load included in the power receiving apparatus; and a control unit configured to, in a case where the output voltage is changed by the change unit after the data is transmitted by the transmission unit, control the data not to be used in the second detection processing.

2. The power receiving apparatus according to claim 1, wherein, in a case where the output voltage is changed by the change unit after the data is transmitted by the transmission unit, the control unit controls different data indicating received power of the power receiving apparatus, to be transmitted by the transmission unit, and controls a time since the data is transmitted by the transmission unit, until the different data indicating received power of the power receiving apparatus is transmitted, to be shorter than a predetermined time.

3. The power receiving apparatus according to claim 2, wherein, in a case where the transmission unit transmits data indicating received power of the power receiving apparatus, at a predetermined interval, the predetermined time is a time since data is transmitted, until next data is transmitted.

4. The power receiving apparatus according to claim 1, wherein, in a case where the output voltage is changed by the change unit after the data is transmitted by the transmission unit, the control unit controls different data indicating received power of the power receiving apparatus, to be transmitted by the transmission unit, and controls information for causing the power transmission apparatus to discard the data transmitted by the transmission unit, to be transmitted to the power transmission apparatus.

5. The power receiving apparatus according to claim 4, wherein the information for causing the power transmission apparatus to discard the data is information included in different data indicating received power of the power receiving apparatus.

6. The power receiving apparatus according to claim 1, wherein the power transmission apparatus performs the first detection processing by performing, a plurality of times, processing of acquiring values of voltages or currents at at least two time points in a predetermined period during which power transmission is restricted.

7. The power receiving apparatus according to claim 1, wherein the data is a Received Power Value in a Wireless Power Consortium standard.

8. The power receiving apparatus according to claim 1, further comprising a receiving unit configured to receive a response indicating that data transmitted by the transmission unit is used or not used in the second detection processing.

9. The power receiving apparatus according to claim 8, wherein the response is acknowledge (ACK) or negative acknowledge (NAK) in a Wireless Power Consortium standard.

10. The power receiving apparatus according to claim 1, further comprising:

a battery configured to store power received by the power receiving unit; and a motor configured to perform driving using power stored in the battery.

11. The power receiving apparatus according to claim 1, further comprising:

a battery configured to store power received by the power receiving unit; and a display unit to which power stored in the battery is supplied.

12. The power receiving apparatus according to claim 1, further comprising:

a battery configured to store power received by the power receiving unit; and a notification unit configured to issue a notification of a remaining amount of the battery.

13. A power receiving apparatus comprising:

a power receiving unit configured to wirelessly receive power from a power transmission apparatus that performs first detection processing of detecting a foreign object based on values of voltages or currents at at least two time points in a predetermined period during which power transmission is restricted;

a transmission unit configured to transmit, to the power transmission apparatus, data indicating received power of the power receiving apparatus that is to be used in second detection processing in which the power transmission apparatus detects a foreign object based on power loss that is based on transmitted power of the power transmission apparatus and received power of the power receiving apparatus, in accordance with a result of the first detection processing;

a change unit configured to change an output voltage to be output to a load included in the power receiving apparatus; and a control unit configured to control the data to be transmitted by the transmission unit after the output voltage is changed by the change unit.

14. The power receiving apparatus according to claim 13, further comprising a detection unit configured to detect that the output voltage is changed by the change unit, wherein the control unit controls the data to be transmitted by the transmission unit, in accordance with it being detected by the detection unit that the output voltage is changed.

* * * * *